(12) United States Patent
Fujita et al.

(10) Patent No.: US 10,518,999 B2
(45) Date of Patent: Dec. 31, 2019

(54) CONTROL DEVICE FOR CONTROLLING AN IMAGE FORMING SYSTEM HAVING AN IMAGE FORMING APPARATUS AND A SHEET STACKING APPARATUS

(71) Applicant: CANON KABUSHIKI KAISHA, Tokyo (JP)

(72) Inventors: Ryo Fujita, Tokyo (JP); Jerome Guermont, Dusseldorf (DE); Toru Shinnae, Kashiwa (JP); Nobuaki Miyahara, Moriya (JP); Yoshitaka Oba, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/982,811

(22) Filed: May 17, 2018

(65) Prior Publication Data

US 2018/0334351 A1 Nov. 22, 2018

(30) Foreign Application Priority Data

May 22, 2017 (JP) ................................ 2017-101139

(51) Int. Cl.
*G06K 15/16* (2006.01)
*B65H 43/06* (2006.01)
(Continued)

(52) U.S. Cl.
CPC ............. *B65H 43/06* (2013.01); *B65H 31/10* (2013.01); *B65H 31/24* (2013.01); *B65H 31/32* (2013.01);
(Continued)

(58) Field of Classification Search
CPC .. G03G 15/50; G03G 15/607; G03G 15/6538; G03G 15/6547; G03G 2215/00556; B65H 43/06; B65H 31/24
(Continued)

(56) References Cited

U.S. PATENT DOCUMENTS 8,055,183 B2  11/2011  Inenaga
8,177,222 B2   5/2012  Yaginuma
(Continued)

FOREIGN PATENT DOCUMENTS

CN  101135959 A   3/2008
CN  101867719 A  10/2010
(Continued)

*Primary Examiner* — Jamares Q Washington
(74) *Attorney, Agent, or Firm* — Canon U.S.A., Inc. IP Division

(57) ABSTRACT

A control device includes a storage and a controller and controls a system having an image forming apparatus to form an image onto a sheet based on an image forming job, and a sheet stacking apparatus having a stacking tray. The storage stores stacking state information indicating a state of sheets stacked and/or to be stacked on the stacking tray. The controller controls to generate a system configuration image that visualizes a configuration of the system, to generate a sheet bundle image that visualizes a sheet bundle stacked on the tray, and to display a screen in which the sheet bundle image is combined at a position of the stacking tray in the system configuration image. The controller controls to display the sheet bundle image such that sheets of a processed job, sheets of a job being processed, and sheets of a processing waiting job are distinguished from each other.

11 Claims, 14 Drawing Sheets

(51) Int. Cl.
*B65H 31/24* (2006.01)
*G03G 15/00* (2006.01)
*B65H 31/10* (2006.01)
*B65H 31/32* (2006.01)
*G06F 3/12* (2006.01)

(52) U.S. Cl.
CPC ......... *G03G 15/50* (2013.01); *G03G 15/5016* (2013.01); *G03G 15/6529* (2013.01); *G03G 15/6538* (2013.01); *G06F 3/1229* (2013.01); *G06F 3/1259* (2013.01); *B65H 2220/02* (2013.01); *B65H 2402/10* (2013.01); *B65H 2405/15* (2013.01); *B65H 2511/20* (2013.01); *B65H 2801/06* (2013.01); *G03G 2215/00556* (2013.01)

(58) Field of Classification Search
USPC ............. 358/1.15, 1.12, 1.13; 271/3.03, 3.13
See application file for complete search history.

(56) References Cited

U.S. PATENT DOCUMENTS

| | | | |
|---|---|---|---|
| 9,242,829 | B2 | 1/2016 | Miyajima |
| 2001/0054793 | A1* | 12/2001 | Nakahira ............... B65H 39/11 271/298 |
| 2005/0017426 | A1 | 1/2005 | Hirata |
| 2006/0082818 | A1 | 4/2006 | Kasamatsu |
| 2006/0261543 | A1 | 11/2006 | Miyake |
| 2006/0285869 | A1* | 12/2006 | Kushida ............. G03G 15/5016 399/81 |
| 2008/0055637 | A1 | 3/2008 | Hatakeyama |
| 2008/0178120 | A1 | 7/2008 | Yamamoto |
| 2009/0041482 | A1* | 2/2009 | Inenaga ............. G03G 15/6547 399/23 |
| 2010/0251170 | A1 | 9/2010 | Louch |
| 2011/0075195 | A1* | 3/2011 | Cain .................... G06F 3/1205 358/1.15 |
| 2011/0157642 | A1 | 6/2011 | Nemoto |
| 2011/0211888 | A1 | 9/2011 | Fujinaga |
| 2013/0334771 | A1 | 12/2013 | Igarashi |
| 2015/0098101 | A1 | 4/2015 | Asakawa |
| 2016/0031669 | A1 | 2/2016 | Mori |
| 2016/0052320 | A1 | 2/2016 | Mutsuno |
| 2016/0162222 | A1 | 6/2016 | De Boer |

FOREIGN PATENT DOCUMENTS

| | | |
|---|---|---|
| CN | 101873430 A | 10/2010 |
| CN | 102166896 A | 8/2011 |
| CN | 102189775 A | 9/2011 |
| CN | 102207950 A | 10/2011 |
| CN | 102365635 A | 2/2012 |
| CN | 103508245 A | 1/2014 |
| CN | 103863876 A | 6/2014 |
| JP | 2002362821 A | 12/2002 |
| JP | 2009137186 A | 6/2009 |
| JP | 2013146898 A | 8/2013 |
| JP | 2014098875 A | 5/2014 |

* cited by examiner

FIG. 13A

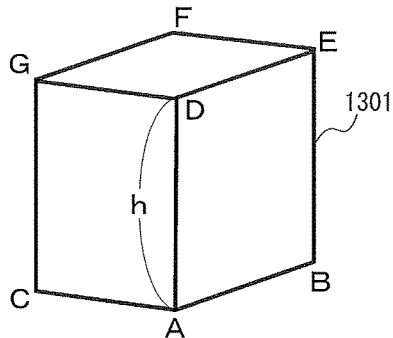

FIG. 13B

| | COORDINATE POSITION 1302 |
|---|---|
| A | TRAY POSITION COORDINATES (x , y) |
| B | x+33 , y-13 |
| C | x-35 , y-5 |
| D | x, y-h |
| E | x+33 , y-h-13 |
| F | x-5 , y-h-17 |
| G | x-35 , y-h-5 |

```
<path stroke="black" stroke-width="1" fill=COLOR fill-opacity="0.7" d="M x (y-h) L (x+33) (y-h-13) L (x-5) (y-h-17) L (x-35) (y-h-5) Z"/>
<path stroke="black" stroke-width="1" fill=COLOR fill-opacity="0.7" d="M x (y-h) L (x-35) (y-h-5) L (x-35) (y-5) L x y Z"/>
<path stroke="black" stroke-width="1" fill=COLOR fill-opacity="0.7" d="M x (y-h) L x y L (x+33) (y-13) L (x+33) (y-h-13) Z"/>
```

| STEP | COORDINATES OF A | SHEET HEIGHT h | DISPLAY COLOR COLOR |
|---|---|---|---|
| S1204 | TRAY POSITION COORDINATES =(X, Y) | h1 | white |
| S1205 | (X, Y-h1) | h2 | green |
| S1206 | (X, Y-h1-h2) | h3 | yellow |
| S1207 | (X, Y-h1-h2-h3) | h4 | blue |

CONTROL DEVICE FOR CONTROLLING AN IMAGE FORMING SYSTEM HAVING AN IMAGE FORMING APPARATUS AND A SHEET STACKING APPARATUS

BACKGROUND OF THE INVENTION

Field of the Invention

The present disclosure relates to a control device for controlling an image forming apparatus to which a plurality of sheet discharge apparatus are mountable.

Description of the Related Art

There are known service forms for image formation called print on demand (POD) and production printing. In such service forms, for example, small-lot and high-variety image formation orders are received from customers. Then, images are quickly formed with use of an image forming apparatus operating at high speed to deliver the orders. At this time, images are rapidly formed onto a large amount of sheets (sheet-like media, the same holds true in the following), and the sheets are discharged. A large-capacity stacker is prepared at a discharge destination. The large-capacity stacker of this type stacks several thousands of sheets at one time. A plurality of large-capacity stackers may be mounted so that, even when one large-capacity stacker is full, image formation can be continued by automatically switching a discharge destination to another large-capacity stacker. In this case, sheets (sheets having images formed thereon, the same holds true in the following) and corresponding to the same image forming job are discharged to a plurality of portions in a divided manner.

Further, when a large number of image forming jobs are simultaneously input to the image forming apparatus, and images are sequentially formed, the total number of sheets to be discharged based on the input image forming jobs may be larger than the capacity of the large-capacity stacker. In such a case, an operator is required to collect the discharged sheets at a certain and appropriate timing to proceed to the next step. Otherwise, a sheet stacking portion becomes full. In this case, the operation of the image forming apparatus stops, and the productivity reduces. However, it is difficult to visually recognize the amount of sheets that are stacked in a large amount and may be discharged to a plurality of stacking portions in a divided manner in some cases. Further, the number of works to be performed by the operator increases. It is farther difficult to visually recognize the total number of sheets that are not stacked on a sheet discharge apparatus yet but are to be stacked in the future. In a technology described in U.S. Pat. No. 8,055,183, both of a current stacking amount with respect to the sheet discharge apparatus and an estimated stacking amount that may be stacked through execution of a reserved job are displayed on a setting screen. In this manner, the amount of sheets can be easily recognized.

In the technology disclosed in U.S. Pat. No. 8,055,183, the sheet stacking amount corresponding to the reserved job and the sheet stacking amount corresponding to other image forming jobs can be recognized in a distinguished manner. However, as the state of the reserved job, there are further a standby state in which a job has been registered in the image forming apparatus, and a print waiting state in which a printing instruction has been issued. Further, in printing sheets corresponding to a job in the print waiting state, an amount of discharged sheets and an amount of sheets to be discharged in the future may be recognized in a distinguished manner. This is for estimation of the number of times of work, for example, estimation of how many more times the discharged sheets are required to be taken out in order to prevent a state in which the sheets reach the maximum stackable amount of the sheet discharge apparatus and thus cannot be stacked any more, that is, to prevent a fully-stacked state. Estimation of the fully-stacked state is difficult in the technology of U.S. Pat. No. 8,055,183.

SUMMARY OF THE INVENTION

The present disclosure works towards providing an image forming system that allows easy recognition of a current stacking state and a future stacking state at a sheet discharge destination for each image forming job and each sheet state.

According to an aspect of the present invention, a control device to control a system having an image forming apparatus to form an image onto a sheet based on an image forming job, and a sheet stacking apparatus having a stacking tray on which the sheet is to be stacked, includes a storage configured to store stacking state information indicating a state of sheets stacked and/or to be stacked on the stacking tray, and a controller configured to control to generate a system configuration image that visualizes a configuration of the system, to generate a sheet bundle image that visualizes a sheet bundle stacked on the stacking tray, and to display a screen in which the sheet bundle image is combined at a position of the stacking tray in the system configuration image, wherein the controller is configured to control to display the sheet bundle image such that sheets of a processed job, sheets of a job being processed, and sheets of a processing waiting job are distinguished from each other, wherein the processed job is a job for which processing is finished, wherein the job being processed is a job for which the processing is being executed, and wherein the processing waiting job is a job for which the processing waits.

Further features of the present disclosure will become apparent from the following description of embodiments (with reference to the attached drawings).

BRIEF DESCRIPTION OF THE DRAWINGS

FIG. 13A is an illustration of a sheet image.

FIG. 13B is an illustration of a list.

FIG. 13C is an illustration of a rendering command using scalable vector graphics (SVG).

FIG. 13D is an illustration of a correspondence table between jobs and colors.

DESCRIPTION OF THE EMBODIMENTS

First Embodiment

Figure 1:
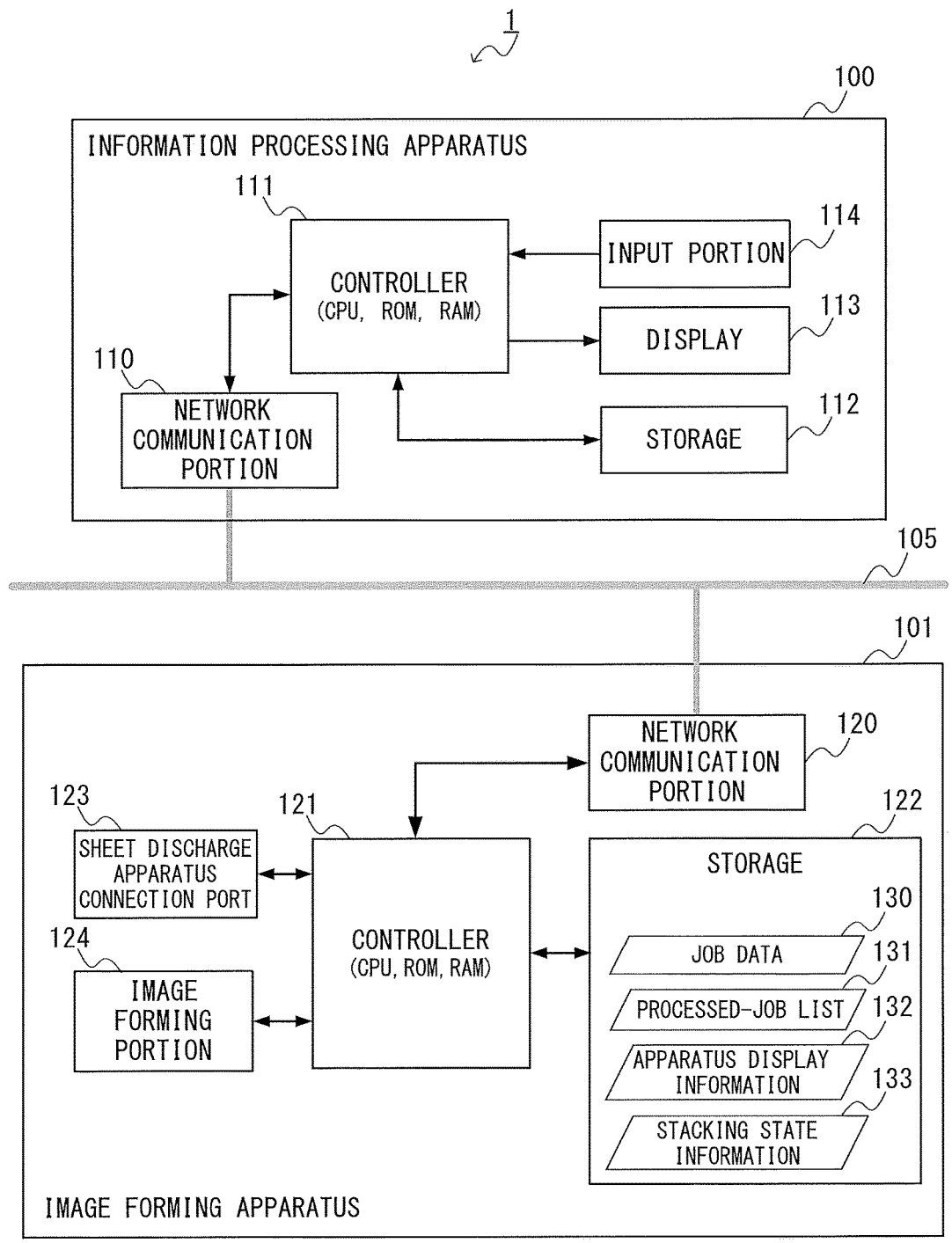
FIG. 1 is a configuration diagram of an image forming system.

FIG. 1 is a diagram for illustrating a schematic configuration example of an image forming system to which the present disclosure is applied. This image forming system 1 includes an information processing apparatus 100 and an image forming apparatus 101, which are mounted to a communication network 105. The first embodiment represents an example in which one information processing apparatus 100 and one image forming apparatus 101 are provided, but a plurality of information processing apparatus 100 and a plurality of image forming apparatus 101 may be provided. The communication network 105 is a local area network (LAN). As the communication network 105, a wide area network (VAN), a combination of the LAN and the WAN, or a wired network may be employed instead.

The information processing apparatus 100 includes a network communication portion 110, a controller 111, a storage 112, a display 113, and an input portion 114. The network communication portion 110 is a communication device for controlling communication performed with the communication network 105. The storage 112 is a storage for storing large-capacity data in a short or long term. The display 113 is a display for performing various types of display for an operator. In the first embodiment, the display 113 displays a monitor screen including a system configuration image and a sheet image to be described later. The input portion 114 receives, for example, various instructions from the operator, range designation, input data, and designation of an image forming job. An image forming job for which the processing of image formation and discharge of a sheet having an image formed thereon is finished is particularly called "processed job". When the display 113 is constructed of a touch panel, various instructions from the operator can also be input from the display 113.

The controller 111 is one type of computer including a central processing unit (CPU), a read only memory (ROM), and a random access memory (RAM). The CPU executes a computer program for terminal control to form various functions for the information processing apparatus 100. This operation is described later. The ROM stores the above-mentioned computer program and the like. The RAM is a work memory for the CPU.

The image forming apparatus 101 includes a network communication portion 120, a controller 121, a storage 122, a sheet discharge apparatus connection port 123, and an image forming portion 124. The network communication portion 120 is a communication device for controlling communication performed with the communication network 105. The storage 122 is a storage for storing large-capacity data in a short or long term. The sheet discharge apparatus connection port 123 is a connection device for connecting the sheet discharge apparatus. The image forming portion 124 is an image forming device for forming an image onto a sheet for each input image forming job. The controller 121 is a computer including a CPU, a ROM, and a RAM, or may be an embedded computer. The CPU executes a computer program for image formation control to form various functions for the image forming apparatus 101 and operate as a control device for controlling an operation of each of the functions. This operation is described later. The ROM stores the above-mentioned computer program for image formation control. The RAM is a work memory for the CPU.

The storage 122 of the image forming apparatus 101 stores job data 130, a job list 131, apparatus display information 132, and stacking state information 133. Examples of the job data 130 include image data and instruction data representing the details of the input image forming job, data obtained after execution of the image forming job, and data obtained during the process of execution of the image forming job. The job list is a list storing states of the image forming jobs executed by the image forming apparatus 101. The job list 131 stores job attributes such as a job ID, a job name, the number of pages (sheets), the number of bundles, and a sheet type in association with one another.

The apparatus display information 132 is one type of first information representing an entire arrangement mode including a state in which a sheet stacking device is mounted to the image forming device and positional information on a sheet stacking portion in the sheet stacking device. The apparatus display information 132 is referred to when, for example, the system configuration image to be described later is generated. In this example, the image forming device corresponds to the image forming apparatus 101, and the sheet stacking device corresponds to the sheet discharge apparatus to be described later. Therefore, information representing the outer appearance, structure, and size of each of the image forming apparatus 101 and the sheet discharge apparatus, and the outer appearance, structure, and size as a whole during connecting is referred to as the apparatus display information 132. The apparatus display information 132 further includes a position of a sheet discharge tray, which serves as the sheet stacking portion. It is assumed that, for example, three sheet discharge apparatus are mounted to the image forming apparatus 101 in a daisy-chain configuration. In this case, the apparatus display information 132 represents a mode in which, when three sheet discharge apparatus are connected to the image forming apparatus 101 in a daisy-chain configuration, the sheet discharge apparatus adjacent to the image forming apparatus 101 is arranged as the first sheet discharge apparatus, and then the second sheet discharge apparatus and the third sheet discharge apparatus are sequentially arranged. The apparatus display information 132 is determined based on the combination of the mounted sheet discharge apparatus. The sheet discharge apparatus is arranged to be replaceable with other sheet discharge apparatus. Therefore, the apparatus display information 132 is updated to new information as appropriate.

The stacking state information 133 is one type of second information representing a stacking state including an amount of sheets having images formed thereon in each sheet stacking device. The stacking state information 133 is referred to when the sheet image to be described later is generated. The sheet having the image formed thereon is referred to as "sheet" except for a case in which sheets before and after the image formation are particularly focused. Further, a group of two sheets or more is hereinafter referred to as "sheet bundle" in some cases. The stacking state information 133 includes information representing the shape and the size of the sheet or the sheet bundle, which is required for generating the sheet image to be described later. This information is updated in real time every time a detection result of a stacking state detected by detection device to be described later is acquired. The "stacking state" herein refers to presence or absence of a sheet at a sheet stacking portion (including the change in portion at which the sheets are stacked), and the transition of the outer shape and the size of the sheet having the image formed thereon and the sheet stacking height, that is, refers to all the changes in sheet state until the sheets are collected by an ejecting operation to be described later.

Next, the sheet discharge apparatus to be mounted to the sheet discharge apparatus connection port 123 of the image forming apparatus 101 are described. The sheet discharge apparatus refers to a large-capacity stacker and a finisher, and are apparatus capable of being freely combined or replaced afterwards. Those sheet discharge apparatus operate as sheet stacking device capable of stacking and collecting the sheets or the sheet bundle for each image forming job. That is, each sheet discharge apparatus stacks sheets corresponding to a processed job onto the sheet stacking portion to achieve a sheet bundle of each image forming job.

Figure 2:
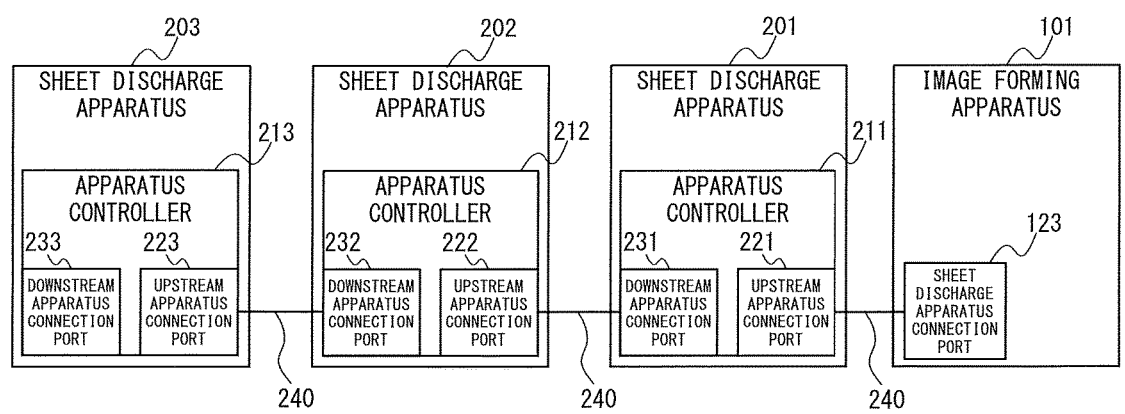
FIG. 2 is a schematic diagram for illustrating a state in which sheet discharge apparatus are mounted to an image forming apparatus.

FIG. 2 is a schematic diagram for illustrating an example in a case where three sheet discharge apparatus 201 to 203 are mounted to the sheet discharge apparatus connection port 123 in a daisy-chain configuration. The sheet discharge apparatus 201 to 203 include apparatus controllers 211, 212, and 213, respectively, for controlling the operation of each own apparatus. The apparatus controllers 211, 212, and 213 include upstream apparatus connection ports 221, 222, and 223 and downstream apparatus connection ports 231, 232, and 233, respectively. Each of the upstream apparatus connection ports 221, 222, and 223 is a port for connecting the own apparatus to an apparatus on the upstream of the own apparatus via a communication cable 240. Each of the downstream apparatus connection ports 231, 232, and 233 is a port for connecting the own apparatus to an apparatus on the downstream of the own apparatus via the communication cable 240. In this manner, the image forming apparatus 101 and the three sheet discharge apparatus 201, 202, and 203 can communicate with each other. The third sheet discharge apparatus 203 may be omitted, or another apparatus that can communicate with the image forming apparatus 101 may be mounted on the downstream of the third sheet discharge apparatus 203.

Figure 3:
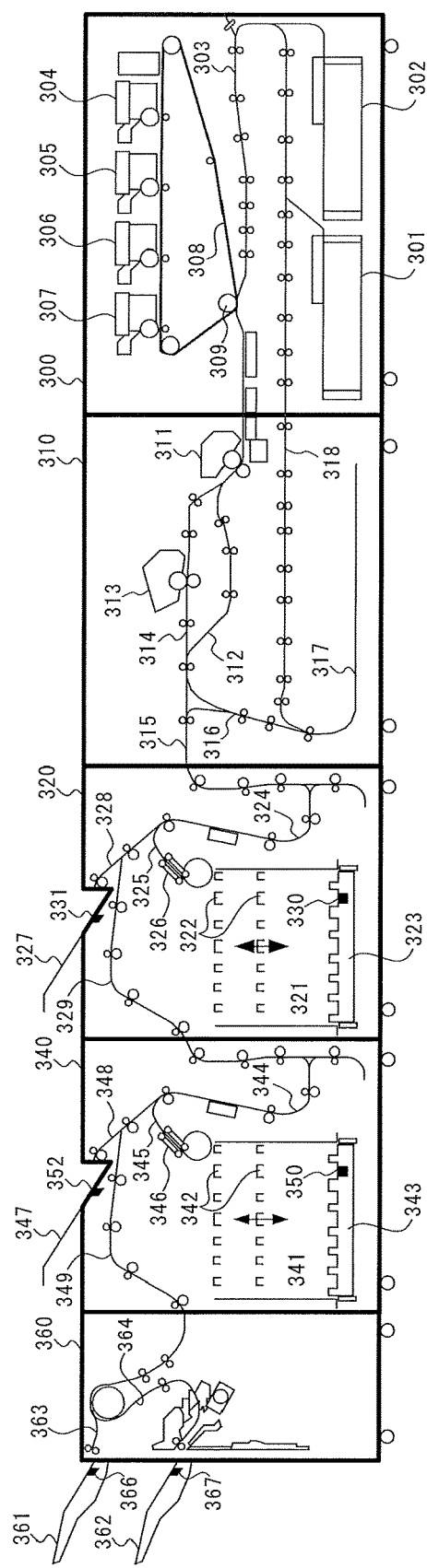
FIG. 3 is a sectional view for illustrating conveyance mechanisms of the image forming system.

Each of the image forming apparatus 101 and the sheet discharge apparatus 201, 202, and 203 includes a sheet conveyance mechanism as a mechanical element. FIG. 3 is an explanatory view for illustrating those conveyance mechanisms. In FIG. 3, an image forming unit 300 is a unit configured to form an image to be transferred onto a sheet before image formation, and corresponds to the image forming portion 124 in FIG. 1. An image fixing unit 310 is a unit configured to fix the transferred image. Two large-capacity stackers 320 and 340 and one finisher 360 are mounted to the image fixing unit 310 in a daisy-chain configuration.

In the image forming unit 300, each of sheet feeding decks 301 and 302 separates one uppermost sheet among the received sheets before image formation to convey the sheet to a sheet conveyance path 303. Development stations 304 to 307 use toner having colors of yellow (Y), magenta (M), cyan (C), and black (K) to cause adhesion of toner images. The adhering toner images are primarily transferred onto an intermediate transfer belt 308. The intermediate transfer belt 308 rotates, for example, clockwise to convey the sheet to a secondary transfer position 309. At this time, the toner images are transferred onto the sheet conveyed through the sheet conveyance path 303. The sheet having the toner images transferred thereon is conveyed to the image fixing unit 310.

In the image fixing unit 310, a fixing unit 311 melts and pressurizes the toner images to fix the toner images onto the sheet. The sheet that has passed through the fixing unit 311 is conveyed from a sheet conveyance path 312 to a sheet conveyance path 315. Additional heating and pressurization may be required depending on the sheet type. In this case, after the sheet passes through the fixing unit 311, the sheet is conveyed to a second fixing unit 313 with use of a sheet conveyance path in the stage subsequent to the fixing unit 311. The sheet subjected to additional heating and pressurization is conveyed to a sheet conveyance path 314. A reversing portion 316 reverses the conveyed sheet by a switch-back method. When an image is formed on one side of the sheet, the reversed sheet, that is, the sheet having an image formed thereon, is conveyed to the sheet conveyance path 315. When images are formed on both sides of the sheet, the sheet is conveyed to a duplex reverse path 317, and is reversed to be conveyed to a duplex conveyance path 318. In this manner, an image is formed on the second side at the secondary transfer position 309, and the sheet is conveyed to the sheet conveyance path 315. The sheet that has passed through the sheet conveyance path 315 passes through a sheet conveyance path 324 to be discharged toward the large-capacity stacker 320.

The large-capacity stacker 320 includes a stacking portion 321 including a lift tray 322 and an ejection tray 323, which are each configured to stack sheets. Those trays are controlled by the apparatus controller 211 illustrated in FIG. 2. The lift tray 322 is positioned at a sheet stacking portion having a predetermined height under a state in which no sheets are stacked, and is lowered when the stacking proceeds. The ejection tray 323 is a tray for re-stacking the sheet bundle at a time point at which the lift tray 322 is lowered to a re-stacking position, to thereby eject the sheet bundle to the outside of the apparatus. The lift tray 322 and the ejection tray 323 are formed so that their bars for supporting the sheet bundle are present at alternate positions. Therefore, the sheet bundle on the lift tray 322 can be re-stacked onto the ejection tray 323 without any issue. The sheet passes through the sheet conveyance path 324 and a sheet conveyance path 325 to be conveyed to a sheet discharge unit 326. The sheet discharge unit 326 includes a lower rotary member and an upper rotary member that are configured to nip the sheet, and to discharge the sheet in a flipped manner to the lift tray 322. The action of "discharging the sheet in a flipped manner" refers to an action of discharging the sheet with the front and back sides being reversed so that one of both surfaces of the sheet on a side in contact with the lower rotary member of the sheet discharge unit 326 is turned to become an upper surface on the lift tray 322.

The lift tray 322 is controlled to be lowered by an amount of a height of the stacked sheets as the stacking of the sheets proceeds so that an upper end of the stacked sheets is at a predetermined height. When the lift tray 322 is in a fully-stacked state, the lift tray 322 is lowered to the position of the ejection tray 323. The "fully-stacked state" refers to a state in which the sheets reach a maximum stackable amount of the lift tray 322 and no more sheets can be stacked on the lift tray 322. Then, at a time point at which the lift tray 322 reaches the re-stacking position that is lower than the ejection tray 323, the sheets are re-stacked onto the ejection tray 323. After that, the ejection tray 323 is carried to the outside of the apparatus. In this manner, the sheets are removable. This operation is called "ejecting operation".

The large-capacity stacker 320 further includes a top tray 327. The top tray 327 is one sheet stacking portion mainly used for outputting a sample of the sheets to be stacked on the stacking portion 321. During discharge to the stacking portion 321, one sheet (or one bundle) is output to the top tray 327 as a sample ha this manner, the quality of the image formation can be checked without taking out the sheets stacked in the stacking portion 321. When a sheet is output to the top tray 327, the sheet passes through the sheet conveyance path 324 and a sheet conveyance path 328 to be conveyed to the top tray 327. When a sheet is conveyed to an apparatus on the downstream of the large-capacity stacker 320, the sheet is conveyed through a sheet conveyance path 329.

The ejection tray 323 and the top tray 327 include sheet presence/absence detection sensors 330 and 331, respectively. The sheet presence/absence detection sensors 330 and 331 operate as one type of detection device for detecting the change in stacking state of the sheets on the tray at every predetermined timing. The controller 121 acquires the detection results of the sheet presence/absence detection sensors 330 and 331 in time series, and updates the stacking state information 133 in the storage 122 based on the acquired detection results. The large-capacity stacker 340 has the same configuration as that of the large-capacity stacker 320. That is, the stacking portion 321 (lift tray 322 and ejection tray 323) of the large-capacity stacker 320 corresponds to a stacking portion 341 (lift tray 342 and ejection tray 343) of the large-capacity stacker 340. Similarly, the sheet conveyance paths 324, 325, 323, and 329 and the sheet discharge unit 326 of the large-capacity stacker 320 correspond to sheet conveyance paths 344, 345, 348, and 349 and a sheet discharge unit 346 of the large-capacity stacker 340, respectively. Further, the top tray 327 and the sheet presence/absence detection sensors 330 and 331 of the large-capacity stacker 320 correspond to a top tray 347 and sheet presence/absence detection sensors 350 and 352 of the large-capacity stacker 340, respectively. Those components are controlled by the apparatus controller 212.

The finisher 360 subjects the conveyed sheet to predetermined post-processing under the control of the apparatus controller 213 illustrated in FIG. 2 based on the function designated by the operator. As an example of the post-processing, in this example, the sheet is subjected to stapling (one-portion or two-portion binding) and punching (two or three holes). The finisher 360 includes two sheet discharge trays 361 and 362 each serving as a sheet stacking portion. To the sheet discharge tray 361, a sheet not to be subjected to post-processing, for example, stapling, is discharged through a sheet conveyance path 363. To the sheet discharge tray 362, a sheet subjected to a finishing function designated by the operator is discharged through a sheet conveyance path 364.

Each of the sheet discharge trays 361 and 362 is configured to be freely raised or lowered. It is also possible to perform such an operation that the sheet discharge tray 361 is lowered so that a plurality of sheets subjected to post-processing are stacked onto the sheet discharge tray 361. The sheet discharge trays 361 and 362 include sheet presence/absence detection sensors 366 and 367, respectively, which are each configured to detect the stacking state of the sheets on the tray. The sheet presence/absence detection sensors 366 and 367 also operate as one type of detection device for detecting the change in stacking state of sheets on the tray at every predetermined timing. The detection results are transmitted to the image forming apparatus 101 in time series by the apparatus controllers 211 and 212 included in the large-capacity stackers 320 and 340.

Next, description is given of the stacking state of the sheet or the sheet bundle in the large-capacity stacker 320 with reference to FIG. 4A to FIG. 4G. In each drawing, a right side as viewed from an observer corresponds to a sectional view in which the mechanical elements of the large-capacity stacker 320 are viewed from the front side, and a left side as viewed from the observer corresponds to a sectional view in which the mechanical elements of the large-capacity stacker 320 are viewed from the left lateral side. The large-capacity stacker 340 has a similar configuration, and hence the large-capacity stacker 320 is described as a representative stacker.

Figure 4A:
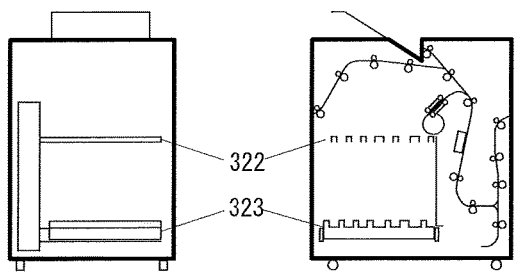
FIG. 4A, FIG. 4B, FIG. 4C, FIG. 4D, FIG. 4E, FIG. 4F, and FIG. 4G are schematic views for illustrating a process of an ejecting operation.

FIG. 4A is an illustration of a state in which no sheets are stacked on the large-capacity stacker 320. The lift tray 322 is raised and stopped at a predetermined height, that is, at a position of a sheet discharge port for discharging the sheets to the stacking portion 321. The ejection tray 323 is accommodated in the apparatus. FIG. 4B is an illustration of a state during an image forming operation (during processing). As the stacking of the sheet proceeds, the apparatus controller 211 gradually lowers the lift tray 322 so that the height of the uppermost surface of the stacked sheets matches the position of the sheet discharge port of the stacking portion 321. FIG. 4C is an illustration of a state in which a fully-stacked state of the lift tray 322 is detected. When the lift tray 322 is in the fully-stacked state, stacking onto the lift tray 322 cannot be continued any more. Therefore, the apparatus controller 211 starts control of re-stacking the stacked sheets onto the ejection tray 323, FIG. 4D is an illustration of a state in which the lift tray 322 is lowered to the re-stacking position of the ejection tray 323 and the sheet bundle is re-stacked onto the ejection tray 323. Even when the lift tray 322 is lowered to the same height as that of the ejection tray 323, the bars for supporting the sheet bundle are located at alternate positions, and hence the bars do not interfere with each other. At a time point at which the lift tray 322 reaches the re-stacking position that is lower than the ejection tray 323, there is obtained a state in which the sheet bundle stacked on the lift tray 322 is re-stacked onto the ejection tray 323.

Figure 4E:
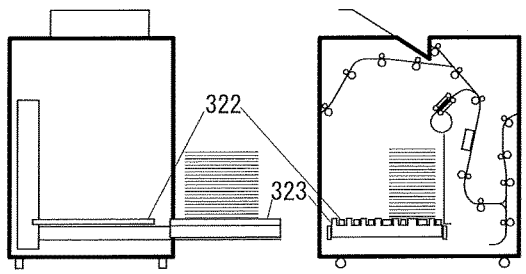
Figure 4B:
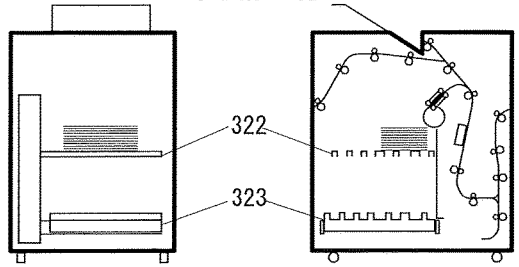
Figure 4F:
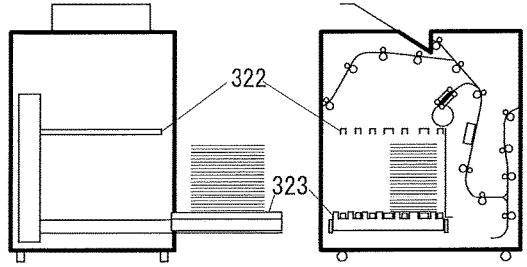
Figure 4C:
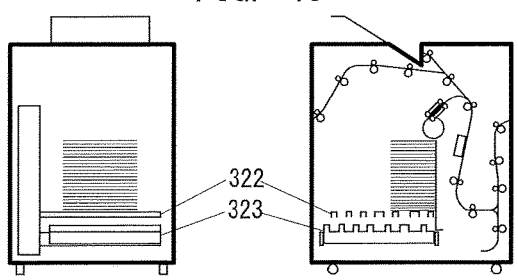
Figure 4G:
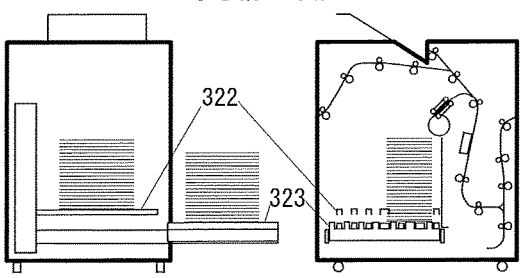
Figure 4D:
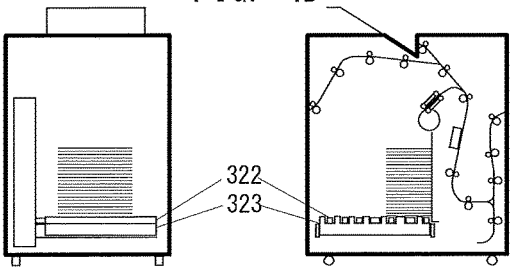

FIG. 4E is an illustration of a state in which the ejection tray 323 having the sheet bundle stacked thereon is ejected to the outside of the apparatus. When the ejection tray 323 is ejected as described above, the stacked sheet bundle becomes collectable. FIG. 4F is an illustration of a state in which, under a state in which the ejection tray 323 is ejected, the lift tray 322 is raised again to the position at which the subsequent sheets are stacked thereonto. In this manner, sheets can be further stacked on the lift tray 322. FIG. 4G is an illustration of a state in which, after the image formation is continued under a state in which the ejection tray 323 is ejected, the fully-stacked state of the lift tray 322 is detected. In this state, the ejection tray 323 is ejected, and hence the sheets stacked on the lift tray 322 cannot be re-stacked onto the ejection tray 323. The sheets stacked on the ejection tray 323 are required to be discharged to the outside of the apparatus and collected to continue the stacking in the large-capacity stacker 320.

Figure 5:
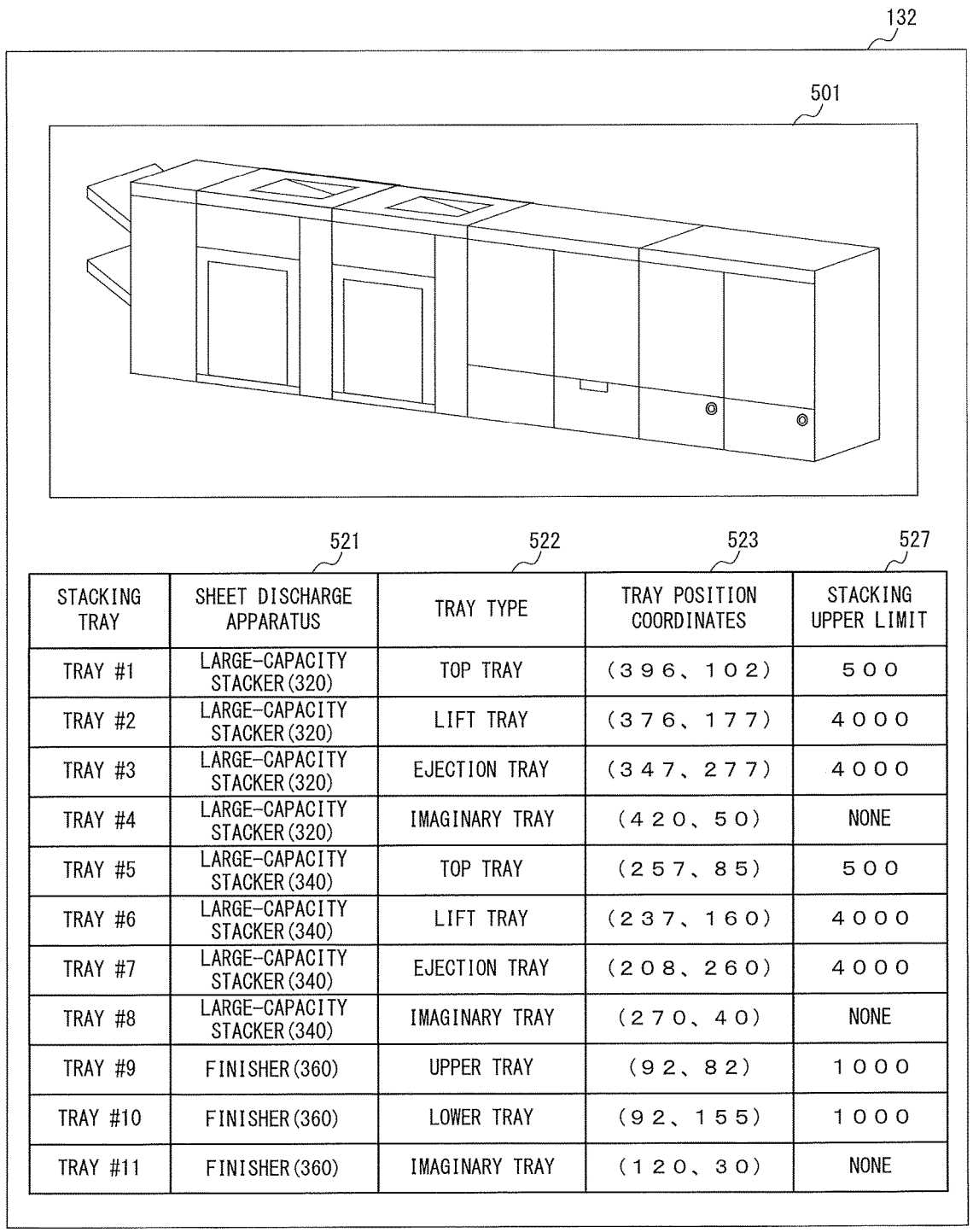
FIG. 5 is a diagram of apparatus display information.

FIG. 5 is a diagram of a monitor screen to be displayed on the display 113 of the information processing apparatus 100 when an image forming job is executed in the image forming apparatus 101. The display content of the monitor screen is generated by the controller 111 based on the apparatus display information 132 received from the image forming apparatus 101. Alternatively, the controller 121 of the image forming apparatus 101 may generate the display content. The content of the apparatus display information 132 differs depending on the combination of the sheet discharge apparatus. In the first embodiment, for the sake of convenience of description, it is assumed that the apparatus display information 132 corresponding to all combinations of mountable sheet discharge apparatus is stored in advance. As an example, description is given of an example of the apparatus display information 132 corresponding to the apparatus configuration exemplified in FIG. 3. A schematic diagram is used in FIG. 5, but the actual apparatus display information 132 is stored in a form of an extensible markup language (XML) or comma-separated values (CSV), for example.

The upper stage of FIG. 5 represents a system configuration image 501 that visualizes the entire arrangement mode in, for example, a bitmap format, and the lower stage of FIG. 5 represents a table in which information on position of the sheet discharge tray included in each sheet discharge apparatus is stored. The system configuration image 501 can be formed and displayed as a two-dimensional image or a three-dimensional image, but is displayed as a three-dimensional image in this case. A sheet is not drawn in the system configuration image 501 illustrated at the upper stage of FIG. 5, but when a sheet is conveyed, a structure image of the sheet discharge tray serving as the sheet stacking portion is also rendered. For example, there is displayed a system configuration image including a structure image representing the lift tray 322 and the ejection tray 323, which are displaced in the above-mentioned large-capacity stacker 320. In the example illustrated in FIG. 3, each of the large-capacity stackers 320 and 340 includes three sheet discharge trays (top tray, lift tray, and ejection tray), and the finisher 360 includes two sheet discharge trays (upper tray and lower tray).

The apparatus display information 132 used in the first embodiment includes, in addition to physical sheet discharge trays (sheet stacking portions) like the stacking portion 321 of the large-capacity stacker 320, one imaginary tray for each sheet discharge apparatus. The imaginary tray is a logical sheet stacking portion used for visualizing information and an amount of sheets to be stacked onto each sheet discharge apparatus in the future. Therefore, in the arrangement mode of the sheet discharge apparatus with respect to the image forming apparatus 101 in the first embodiment, a total of eleven sheet discharge trays are usable. In the system configuration image, an actual arrangement mode and structure images of those sheet discharge apparatus and sheet discharge trays are displayed, and hence the operator can intuitively recognize which sheet discharge tray the sheets are stacked on and whether the sheets are collectable.

In the table shown at the lower stage of FIG. 5, each of records of trays #1 to #11 corresponds to a sheet discharge apparatus 521 to which each tray is installed, a tray type 522, tray position coordinates 523, and a stacking upper limit 527. That is, "tray #1" is the top tray of the large-capacity stacker, and is a tray provided at tray position coordinates (396, 102) with reference to the system configuration image 501 and having a stacking upper limit of 500 (that is, the maximum stackable amount of the sheets is 500). The tray position coordinates are offset values (pixel numbers) in a right direction and a lower direction with the upper left of the system configuration image 501 serving as an origin. Other trays #2, #3, #5 to #7, #9, and #10 have similar content. The trays #4, #8, and #11 are imaginary trays, and hence those trays do not have stacking upper limits.

Figure 6:
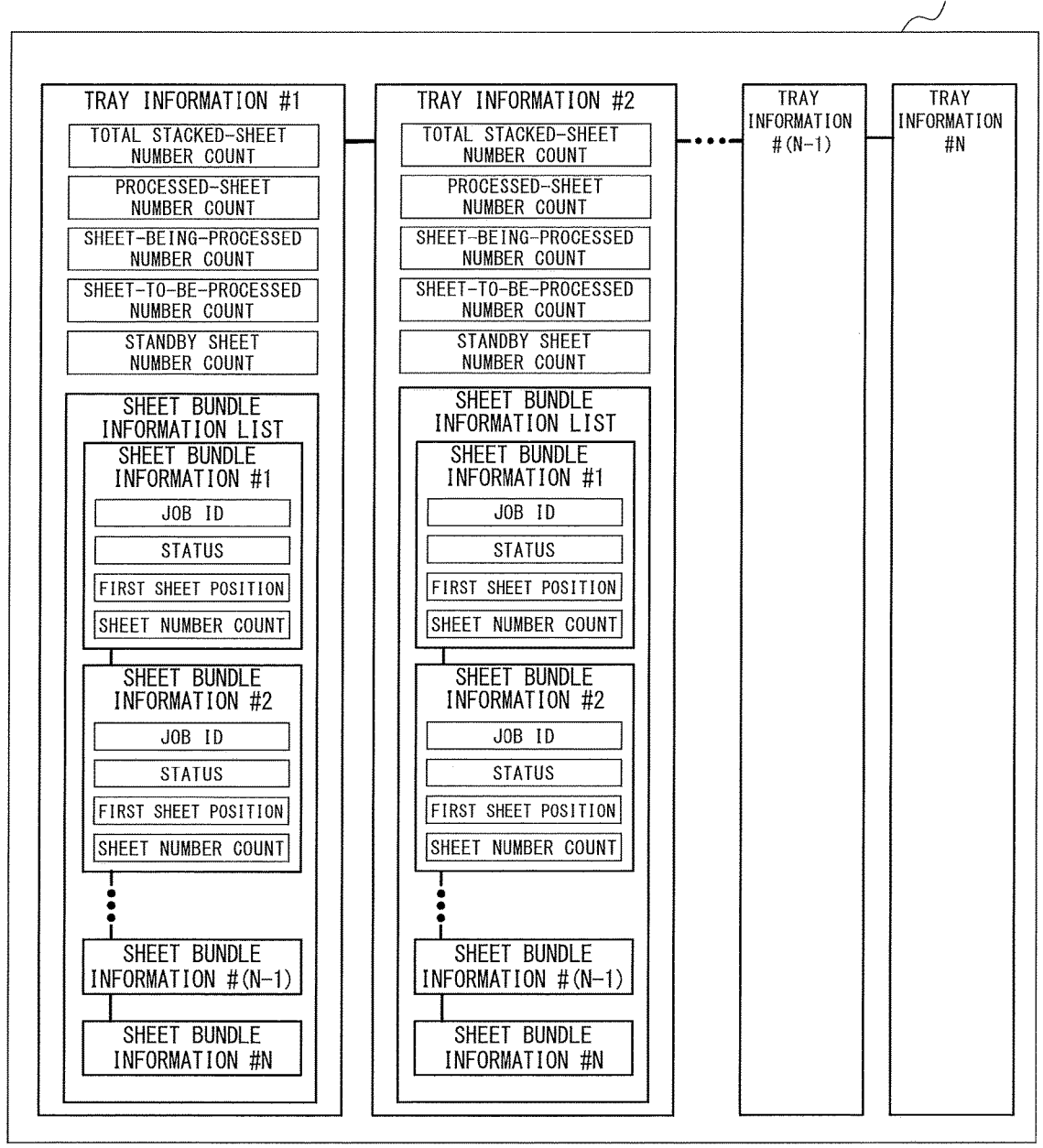
FIG. 6 is a diagram of stacking state information.

FIG. 6 is a diagram of the stacking state information 133. The stacking state information 133 is stored in the storage 122, and is updated at a timing at which the detection result of the stacking state in each sheet discharge tray is acquired, for example, to be able to be referred to as appropriate. The stacking state information 133 has a list-type data structure. That is, tray information representing the stacking state of the usable sheet discharge tray for each tray is represented as tray information #1 to tray information #N. In the relationship with the table shown at the lower stage of FIG. 5, the detection result of the stacking state in the tray #1 corresponds to the tray information #1. The tray information #(N−1) corresponds to the tray 410 at the lower stage of FIG. 5. The tray information #N corresponds to the tray #1 at the lower stage of FIG. 5.

Each piece of tray information #1 to #N is formed of a structure data type. That is, each piece of tray information #1 to #N has, as member variables, five count values and a sheet bundle information list that is a list-type data structure. The five count values are count values of sheets, which are based on job attributes of a job for which image formation has been performed. In the first embodiment, four types of count values, that is, a "processed-sheet number count", a "sheet-being-processed number count", a "sheet-to-be-processed number count", and a "standby sheet number count" are set as variables. The "processed-sheet number count" refers to the number of sheets stacked on the tray N based on the processed job. Such sheets are called "stacked sheets". The "sheet-being-processed number count" refers to the number of sheets to be stacked onto the tray N in the future based on a job for which image formation is being performed (hereinafter referred to as "job being processed"). The "sheet-to-be-processed number count" refers to the number of sheets for which image formation is reserved and which are to be stacked onto the tray N in the future based on an image forming job (hereinafter referred to as "processing waiting job"). The "standby sheet number count" refers to the number of sheets to be stacked onto the tray N in the future although the above-mentioned reservation is not finished yet, based on an image forming job (hereinafter referred to as "standby job"). Sheets that are based on the job being processed, the processing waiting job, and the standby job are called "sheets to be stacked". A "total stacked-sheet number count" is the total number (count number) of stacked sheets and sheets to be stacked.

In the sheet bundle information list, pieces of sheet bundle information for managing the information on respective sheet bundles are arranged in a format of a list in the order of sheet discharge or the order of stacking sheets to the sheet stacking portion. When no sheets are stacked on any sheet discharge tray, the sheet bundle information list is an empty list. Each piece of sheet bundle information #1 to #N has, as member variables, a job ID, a status, a first sheet position, and a sheet number count. The job ID is a variable for representing an ID of a job corresponding to the sheet bundle. Unique IDs are allocated to the above-mentioned four-type jobs by the image forming apparatus 101, and the IDs are stored in the member variables. The status is the above-mentioned job attribute, and has a value representing any one of the four states of "processed", "being processed", "processing waiting", and "standby". The "processed" state represents the processed job, the state of "being processed" represents the job being processed, the "processing waiting" state represents the processing waiting job, and the "standby" state represents the standby job. The first sheet position is a variable representing what number the first sheet of the sheet bundle corresponds to when counted from the first sheet stacked on the sheet discharge tray. The sheet number count is a variable for counting the total number of sheets of the sheet bundle.

Figure 7:
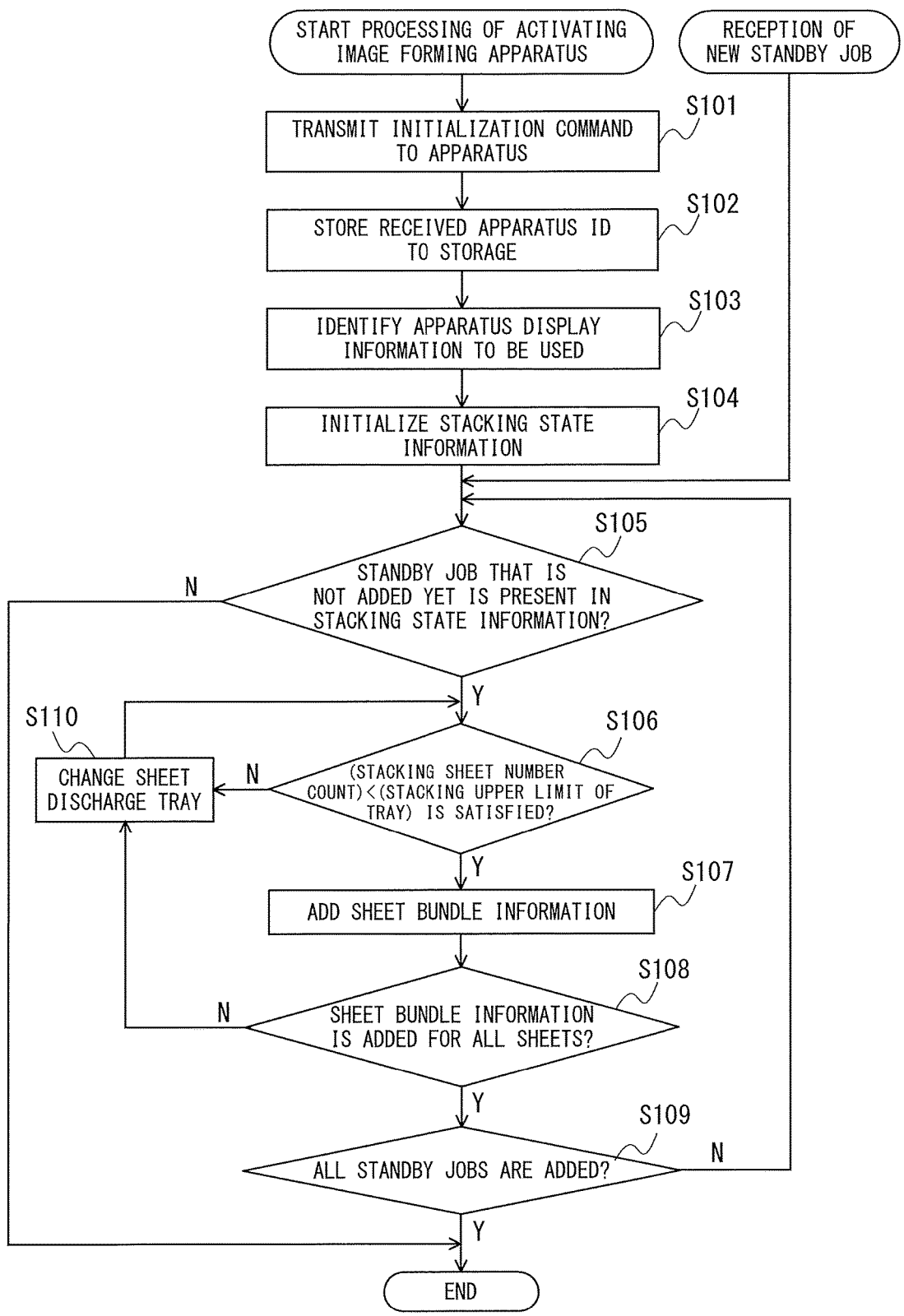
FIG. 7 is a control flow for illustrating an operation procedure at the time when the image forming apparatus is activated.

Next, an operation of the image forming system in the first embodiment is described. First, the operation of the image forming apparatus 101 at the time of activation thereof is described with reference to FIG. 7. FIG. 7 is a control flow executed when the image forming apparatus 101 is activated. This control flow is executed by the controller 121 controlling each portion in the apparatus. When the image forming apparatus 101 is activated, the controller 121 transmits an initialization command to all of the mounted sheet discharge apparatus (Step S101). The initialization command is transmitted to each sheet discharge apparatus via the communication cable. After each sheet discharge apparatus receives the initialization command, the sheet discharge apparatus transmits back to the image forming apparatus 101 the apparatus ID for identifying the type of the own apparatus.

The controller 121 stores the received apparatus ID in the storage 122 (Step S102). With this apparatus ID, for example, the configuration of the currently-mounted sheet discharge apparatus can be recognized. The controller 121 identifies the apparatus display information 132 corresponding to the configuration of the currently-mounted sheet discharge apparatus based on the stored sheet discharge apparatus ID from the apparatus display information 132 stored in advance in accordance with the combination of the sheet discharge apparatus (Step S103). For example, in the apparatus configuration illustrated in FIG. 3, the apparatus display information 132 corresponding to the configuration in which two large-capacity stackers and one finisher are mounted is identified. After the apparatus display information 132 is identified, the controller 121 initializes the stacking state information 133 (Step S104). That is, the stacking state information 133 is newly generated based on the sheet discharge apparatus ID stored in Step S102. Sheets are not stacked yet on any sheet discharge tray immediately after the image forming apparatus 101 is activated. Therefore, in each piece of tray information of the stacking state information 133, the total stacked-sheet number count is 0, and the sheet bundle information list is an empty list.

Next, the controller 121 starts processing of generating sheet bundle information corresponding to the standby job. That is, the controller 121 determines whether or not a standby job that is not added yet is present in the stored stacking state information (Step S105). When no such standby job is present (Step S105: N), the controller 121 immediately ends this processing. In this case, the sheet bundle information list of each piece of tray information remains empty. When such a standby job is present in Step S105 (Step S105: Y), the controller 121 determines whether or not, in the tray information corresponding to an output destination sheet discharge tray of the standby job, the total stacked-sheet number count is smaller than the stacking upper limit of the tray, which is included in the apparatus display information 132 (Step S106). When the total stacked-sheet number count is smaller than the stacking upper limit (Step S106: Y), the controller 121 newly adds the sheet bundle information to the end of the sheet bundle information list of the tray (Step S107). At this time, the controller 111 stores the number of sheets to be processed of the job as the number of remaining sheets of the job. The job ID of the added sheet bundle information is the ID of the standby job, the status is "standby", the first sheet position is the value of the total stacked-sheet number count, and the sheet number count is the smaller one of the number of remaining sheets of the standby job and a value of (stacking upper limit of the tray)–(total stacked-sheet number count). After the sheet bundle information is added, the controller 121 adds the value of the sheet number count of the sheet bundle information to the standby sheet number count and the total stacked-sheet number count of the tray. Further, the controller 121 subtracts the added sheet number count from the number of remaining sheets of the standby job.

After that, the controller 121 determines whether or not the sheet bundle information is added for all sheets (Step S108). Specifically, the controller 121 determines whether or not the number of remaining sheets of the standby job becomes 0 after the sheet bundle information is added in Step S107. When the number of remaining sheets of the standby job is not 0 (Step S108: N) or when the stacked-sheet number count is not smaller than the stacking upper limit in Step S106 (Step S106: N), the controller 121 changes the sheet discharge tray (Step S110). That is, the controller 121 determines the next sheet discharge tray to which the sheet bundle information is to be added. In this case, it is assumed that, in the apparatus display information 132 illustrated in FIG. 5, the imaginary tray of the sheet discharge apparatus designated by the job is determined as the next sheet discharge tray. After that, the processing returns to Step S106, and the sheet bundle information is added for the sheet discharge tray determined in Step S110. When the number of remaining sheets becomes 0 (Step S108: Y), it means that all of the sheets to be processed of the standby job are added as the sheet bundle information to the apparatus display information 132. The above-mentioned processing is repeated until all sheets of the standby job are added to any one of the sheet discharge trays as the sheet bundle information (Step S109: N). Determination is made on whether or not the processing is finished for all standby jobs (Step S109). When the processing is not finished (Step S109: N), the processing returns to Step S105. When the processing is finished (Step S109: Y), the processing is ended. The standby job may be added even after the activation of the image forming apparatus 101 is ended. In this case, the processing of Step S105 and the subsequent steps is performed after the new standby job is received.

Figure 8:
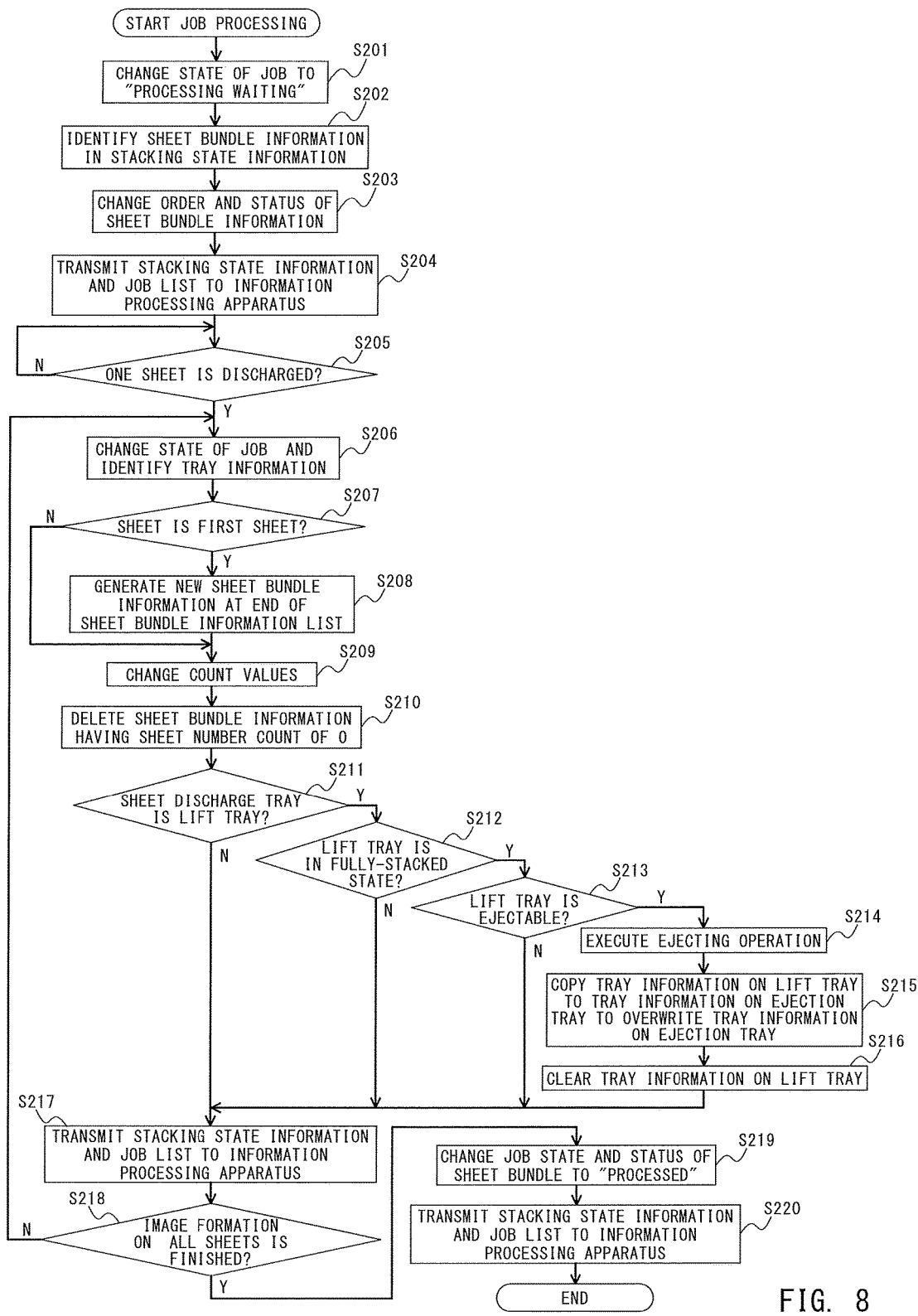
FIG. 8 is a control flow for illustrating an operation procedure at the time when an image forming job is processed.

Next, with reference to FIG. 8, description is given of an operation example at the time when an image forming job is executed in the image forming apparatus 101. FIG. 8 is a control flow to be performed by the controller 121, and is started when an image forming instruction is received for a certain standby job.

The controller 121 changes the state of the standby job to the processing waiting state (Step S201). The controller 121 further identifies the sheet bundle information corresponding to the processing waiting job with use of the job ID from the stacking state information 133 (Step S202). There may be a plurality of pieces of sheet bundle information corresponding to the job. Therefore, the controller 121 refers to the sheet bundle information lists of all of the sheet discharge trays of the stacking state information 133, and lists pieces of sheet bundle information having the same job ID as the job. After that, the controller 121 changes the statuses of all pieces of sheet bundle information identified in Step S202 to "processing waiting" (Step S203). Further, the total value of the sheet number counts changed to "processing waiting" is subtracted from the standby sheet number count of the tray information, and is added to the processing waiting count. Further, the controller 121 transmits the stacking state information 133 and the job list to the information processing apparatus 100 (Step S204). The transmission is performed to notify the information processing apparatus 100 of the status change performed in the job list and the stacking state information 133 in Step S201 and Step S203.

Next, the controller 121 forms an image onto each sheet based on the image forming job in accordance with the order of pages. After the image formation, the sheet is discharged to the designated sheet discharge tray (Step S205). At this time, the state of the job is changed to "being processed" on the job list. After one sheet is discharged (Step S205: Y), the controller 121 identifies the tray information corresponding to the sheet discharge tray used in Step S205 (Step S206). Which tray information the sheet discharge tray corresponds to can be identified by referring to the apparatus display information 132. For example, it is understood by referring to the record of the tray #1 in the first row at the lower stage of FIG. 5 that the tray #1 corresponds to the top tray of the large-capacity stacker 320. This means that the tray information corresponding to the top tray of the large-capacity stacker 320 is the tray information #1. The controller 121 thereafter updates the identified tray information.

Next, the controller 121 determines whether or not the sheet discharged to the sheet discharge tray in Step S205 is the first sheet of the job in the sheet discharge tray (Step S207). When the sheet bundle information list of the sheet discharge tray does not have sheet bundle information having the job ID of the job and the status of "being processed", the sheet is the first sheet. When the sheet is the first sheet (Step S207: Y), the controller 121 generates new sheet bundle information at the end of the sheet bundle information list in the tray information (Step S208). The member variables of the new sheet bundle information generated at this time are as follows. First, the job ID is the job ID of the job being processed. The status is "being processed". The first sheet position is the processed-sheet number count. Finally, the "sheet number count" is 0 at this time point. After that, the controller 121 changes the count values of the sheet bundle information and the tray information (Step S209). When the sheet is not the first sheet in Step S207 (Step S207: N), the count values are changed thereafter. The count values are changed as follows. First, 1 is added to the "processed-sheet number count" and the "sheet number count" of the sheet bundle information. Further, the sheet bundle information having the same job ID as the image forming job and a status of "processing waiting" is identified, and 1 is subtracted from the "sheet number count" of the sheet bundle information and the "sheet-to-be-processed number count".

Next, when there is sheet bundle information in which the "sheet number count" becomes 0 after the sheet number count is reduced in Step S209, the controller 121 deletes the sheet bundle information from the sheet bundle information list (Step S210). As described above, in Steps S205 to S210, every time one sheet is printed for the job, the sheet bundle information corresponding to the image forming job is updated.

Next, the controller 121 determines whether or not the sheet discharge tray used in Step S201 is the lift tray of the large-capacity stacker (Step S211). When the sheet discharge tray is the lift tray (Step S211: Y), the controller 121 determines whether not the lift tray is in the fully-stacked state (Step S212). When the lift tray is in the fully-stacked state (Step S212: Y), the controller 121 determines whether or not the lift tray in the fully-stacked state is ejectable (Step S213). Whether the lift tray is ejectable is determined based on whether or not the sheet bundles are stacked on the ejection tray of the same large-capacity stacker. When the sheet bundles are stacked on the ejection tray, that is, when the sheet presence/absence detection sensor 330 detects that the sheet bundles are stacked, the controller 121 determines that the lift tray is not ejectable. Otherwise, the controller 121 determines that the lift tray is ejectable. When the lift tray is ejectable (Step S213: Y), the controller 121 re-stacks the sheet bundles stacked on the lift tray detected to be in the fully-stacked state in Step S211 onto the ejection tray, and executes the ejecting operation (Step S214). After that, the controller 121 copies, in the stacking state information 133, the tray information on the lift tray for which the ejecting operation is executed, to the tray information on the same large-capacity stacker to overwrite the tray information on the same large-capacity stacker (Step S215). Further, the controller 121 clears the tray information on the lift tray for which the ejecting operation is executed (Step S216). In this case, clearing the tray information refers to obtaining an empty sheet bundle information list by setting the total stacked-sheet number count in the tray information to 0.

When the sheet discharge tray is not the lift tray (Step S211: N), when the lift tray is not in the fully-stacked state (Step S212: N), and when the lift is not ejectable (Step S213: N), the controller 121 transmits the stacking state information 133 to the information processing apparatus 100 (Step S217). The same is applied after the tray information on the lift tray is cleared (Step S216). After that, the controller 121 determines whether or not the image formation on all of the sheets included in the job is finished (Step S218). When the image formation is not finished yet (Step S218: N), the processing returns to Step S206, and the processing of Step S206 and the subsequent steps is repeated. When image formation on all sheets is finished (Step S218: Y), the controller 121 updates the state of the image forming job for which image formation on all sheets is finished in Step S218 to "processed" on the job list. Further, the controller 121 updates the statuses of pieces of sheet bundle information corresponding to the image forming job to "processed". Then, the controller 121 subtracts the total value of the sheet number counts of all of the pieces of the sheet bundle information from the "sheet-being-processed number count", and adds the total value of the sheet number counts of all of the pieces of the sheet bundle information to the "processed-sheet number count" (Step S219). After that, the controller 121 transmits the job list 131 updated in Step S219 and the uprated stacking state information 133 to the information processing apparatus 100 (Step S220), and the series of processing is ended.

Figure 9:
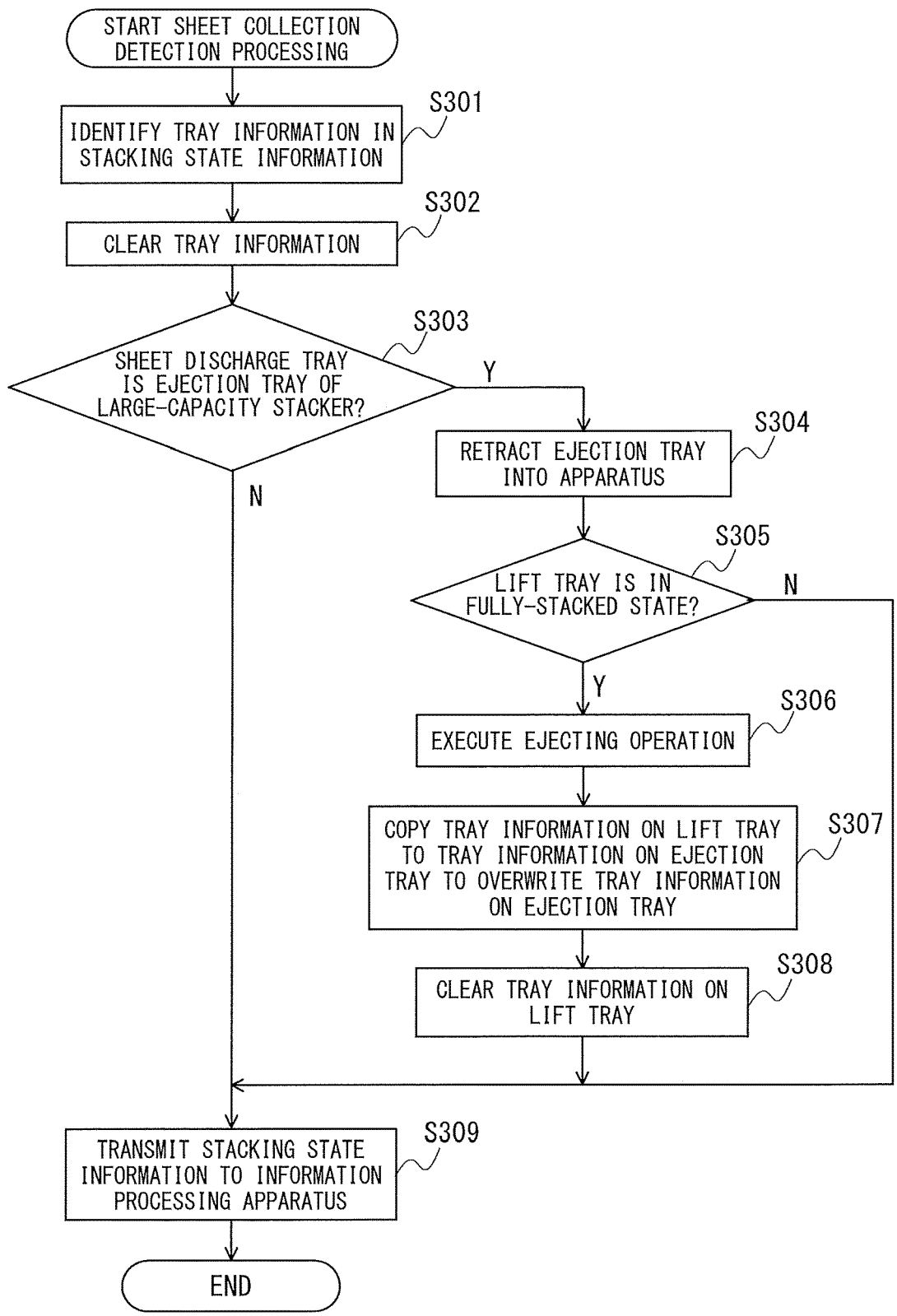
FIG. 9 is a control flow at the time when sheets are removed from a sheet discharge tray.

Next, with reference to FIG. 9, description is given of an operation performed when the collection of sheets from the sheet discharge tray is detected in the image forming apparatus 101. In this case, description is given of an example of a case in which sheets are collected from the large-capacity stacker 320. FIG. 9 is a control flow of sheet collection detection processing. This control flow is also executed by the controller 121 integrally controlling the respective portions of the apparatus. The sheet collection is detected when a state in which the sheet presence/absence detection sensor 330 detects the stacking of the sheet bundle is changed to a state in which the stacking is not detected any more.

The controller 121 refers to the stacking state information 133 to identify the tray information corresponding to the sheet discharge tray at which the sheet collection is detected (Step S301), and then clears the tray information (Step S302). The controller 121 further determines whether or not the sheet discharge tray is the ejection tray 323 of the large-capacity stacker 320 (Step S303). When the sheet discharge tray is the ejection tray 323 (Step S303: Y), the controller 121 retracts the ejection tray 323 into the apparatus (large-capacity stacker 320) (Step S304). Further, the controller 121 determines whether or not the lift tray 322 of the large-capacity stacker 320 at which the sheet collection is detected is in the fully-stacked state (Step S305). When the lift tray 322 is in the fully-stacked state (Step S305: Y), the controller 121 re-stacks the sheets stacked on the lift tray 322 in the fully-stacked state onto the ejection tray 323 to execute the ejecting operation (Step S306). Then, the controller 21 copies, in the stacking state information 133, the tray information on the lift tray 322 for which the ejecting operation is executed, to the tray information on the ejection tray 323 of the large-capacity stacker 320 to overwrite the tray information on the ejection tray 323 (Step S307). After that, the controller 121 clears, in the stacking state information 133, the tray information on the lift tray 322 for which the ejecting operation is executed (Step S308).

When the sheet discharge tray corresponding to the empty tray information is not the ejection tray 323 (Step S303: N), the controller 121 transmits the stacking state information 133 to the information processing apparatus 100 (Step S309), and ends the series of processing. The same processing is performed when the lift tray 322 is not in the fully-stacked state (Step S305: N) and after the tray information on the lift tray 322 is cleared in Step S308.

Figure 10:
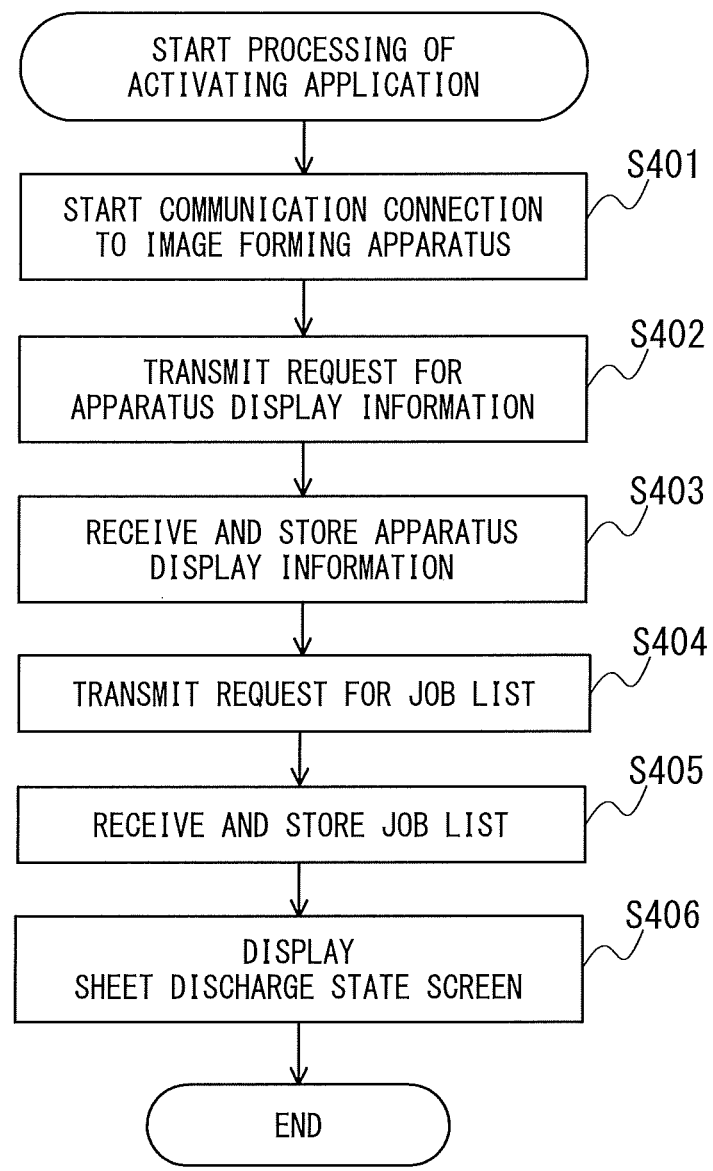
FIG. 10 is a control flow for illustrating an operation procedure (at the time of activation) of an information processing apparatus.

The operator can recognize the sheet or sheet-bundle stacking state of each sheet discharge apparatus mounted to the image forming apparatus 101 as required by an application executed by the computer program for terminal control in the information processing apparatus 100. The operation of the information processing apparatus 100 at this time is described with reference to FIG. 10. FIG. 10 is a process flow of processing of activating the application. This process flow is executed by the controller 111 integrally controlling the respective portions of the terminal.

When an application is activated in the information processing apparatus 100, the controller 111 starts communication connection to the image forming apparatus 101 (Step S401). The communication connection refers to continuous establishment of a communication path until the operator inputs a clear cancel instruction. When the communication path is established, a request for the apparatus display information 132 is transmitted to the image forming apparatus 101 (Step S402). When the image forming apparatus 101 receives this request, the image forming apparatus 101 transmits the apparatus display information 132 corresponding to the current apparatus configuration. When the apparatus display information 132 is updated while the communication connection is established, the image forming apparatus 101 transmits the updated apparatus display information 132 to the information processing apparatus 100. When the information processing apparatus 100 acquires the updated apparatus display information 132 from the image forming apparatus 101, the information processing apparatus 100 sequentially stores the apparatus display information 132 to the storage 112 (Step S403).

The controller 111 further transmits a request for the stacking state information 133 and the job list 131 to the image forming apparatus 101 (Step S404). When the image forming apparatus 10 (controller 121) receives this request, the image forming apparatus 101 (controller 121) transmits the stacking state information 133 and the job list 131 that are currently stored to the information processing apparatus 100. The controller 111 stores the stacking state information 133 and the job list 131 acquired from the image forming apparatus 101 to the storage 112 (Step S405). Further, the controller 111 generates a sheet discharge state screen based on the stored apparatus display information 132, stacking state information 133, and job list 131 to display the sheet discharge state screen on the display 113 (Step S406).

Figure 11:
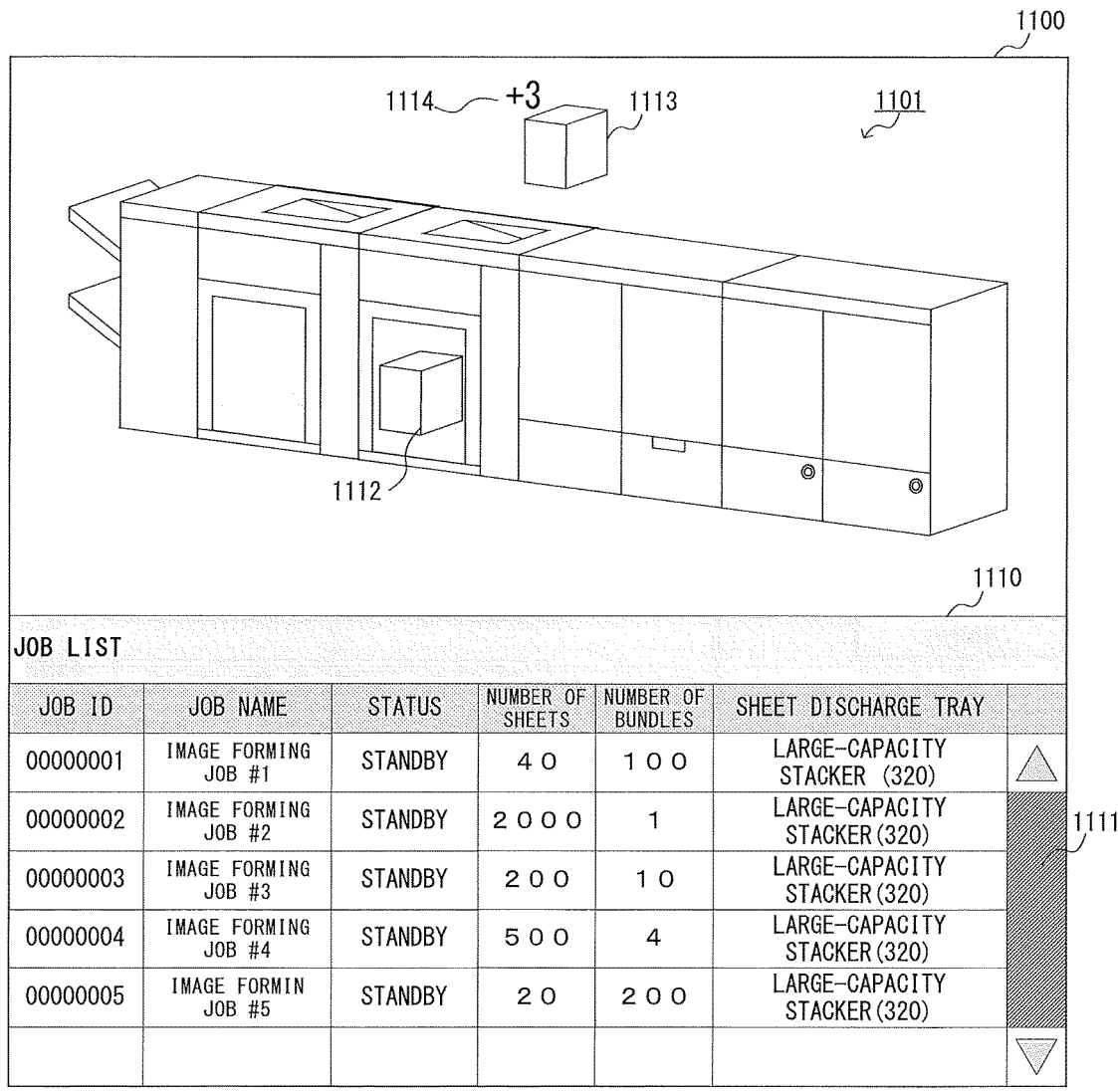
FIG. 11 is a display example of a monitor screen.

An example of a monitor screen is illustrated in FIG. 11. In a monitor screen 1100 exemplified in FIG. 11, an image region 1101 and a list region 1110 are formed. The image region 1101 is a region for visually displaying the system configuration image and the sheet or sheet-bundle stacking state of corresponding to the job attributes, and has a two-display-layer structure. That is, the image region 1101 includes a first display layer for displaying the system configuration image, and a second display layer for mapping and displaying a sheet image at the sheet stacking portion of the system configuration image on the first display layer. In the first display layer, the system configuration image generated based on the apparatus display information 132 stored in Step S403 is displayed. In the second display layer, based on the stacking state information 133 received by the information processing apparatus 100, the sheet image and display of an excess stacking number that are generated based on the sheet or sheet-bundle stacking state in each sheet discharge tray are mapped and displayed. The display of the second display layer is updated in real time at a timing at which the change in sheet stacking state is detected. That is, the controller 111 is configured so that the mode of displaying the sheet image and the display of an excess stacking number on the display 113 can be changed in real time for each image forming job.

In the list region 1110, the job list 131 received by the information processing apparatus 100 from the image forming apparatus 101 is displayed. In the job list 131, job attributes of each job are displayed. When the number of image forming jobs stored in the job list 131 is larger than the number of image forming jobs that can be displayed at one time in the list region 1110, a scroll bar 1111 is used. The operator can use the input portion 114 to operate the scroll bar 1111 displayed on the screen, to thereby view the information on each job attribute. In this case, there is shown an example of a case in which the job list 131 has five standby jobs, and the sheet discharge tray for those jobs is the large-capacity stacker 320. In the second display layer, there are displayed sheet images representing a sheet bundle 1112 and an imaginary sheet bundle 1113, and display of an excess stacking number 1114 corresponding to the imaginary sheet bundle 1113. Now, a method of displaying those images is described in detail with reference to FIG. 12 and FIG. 13A to FIG. 13D.

Figure 12:
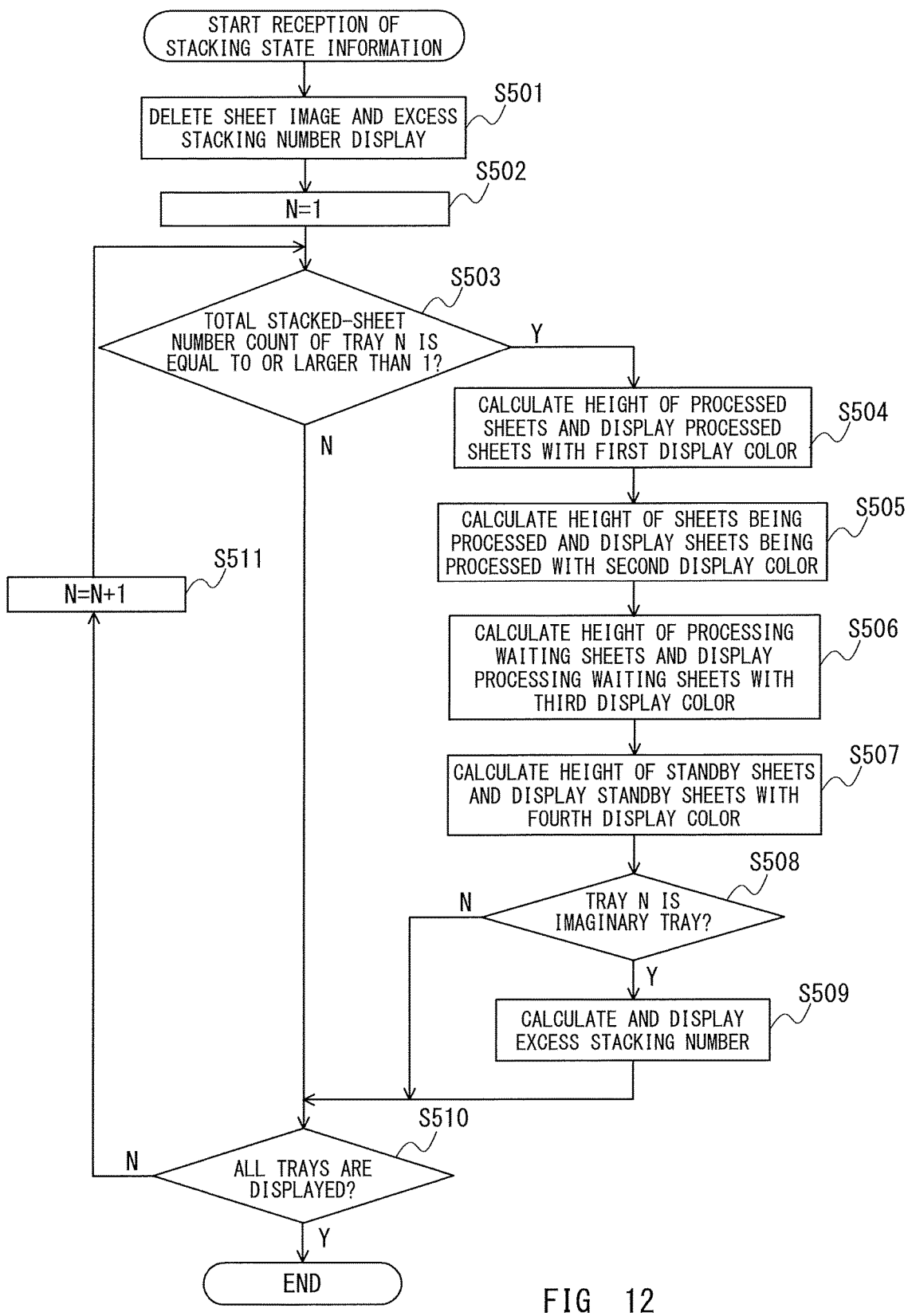
FIG. 12 is a control flow for illustrating another operation procedure of the information processing apparatus.

FIG. 12 is a control flow to be performed by the controller 111 when the information processing apparatus 100 receives the stacking state information from the image forming apparatus 101. The controller 111 deletes the display of the second display layer (Step S501). In this case, the controller 111 deletes all of the sheet images representing the sheet bundles and the excess stacking number. Then, the controller 111 substitutes 1 for a variable N representing the order of trays (Step S502), and determines whether or not, in the received stacking state information, the "total stacked-sheet number count" of the tray N is equal to or larger than 1 (Step S503). When the "total stacked-sheet number count" in the tray information N is 0, it is determined that there are no stacked sheets or sheets to be stacked on the tray. When the "total stacked-sheet number count" is not equal to or larger than 1 (Step S503: N), the processing proceeds to Step S510 without displaying the second display layer for the tray.

When the "total stacked-sheet number count" is equal to or larger than 1 (Step S503: Y), the controller 111 calculates the height (h1 in FIG. 13A) of the processed sheets stacked on the tray N, and the processing proceeds to Step S505. In this case, the pixel of the height of the sheet image representing the processed sheets stacked on the tray N at the time when the sheet image is displayed is calculated. The height of the processed sheets is calculated by multiplying the processed-sheet number count of the tray information N by a predetermined coefficient P. The coefficient P is a coefficient representing the pixel corresponding to the height of one sheet. When the height includes a decimal value as a result of calculation, the value is rounded up to an integer value. The controller 111 further displays the sheet image representing the sheet bundle having the calculated height in the second display layer with a first display color. Similarly, the controller 111 calculates each of the height (h2 in FIG. 13D) of the sheets being processed, which are stacked on the tray N, the height (h3 in FIG. 13D) of the processing waiting sheets, and the height (h4 in FIG. 13D) of the standby sheets (Steps S505, S506, and S507). The heights h2, h3, and h4 are each calculated by multiplying each of the sheet-being-processed number count, the processing waiting sheet number count, and the standby sheet number count of the tray information N by the predetermined coefficient P. Then, the controller 111 displays parts of the sheet bundles having the respective heights of h2, h3, and h4 in the sheet images in the second display layer with use of a second display color, a third display color, and a fourth display color, respectively.

Any number of pieces of sheet bundle information is storable for the imaginary tray having no stacking upper limit. That is, the imaginary tray has no upper limit in sheet number count. However, in the first embodiment, the following upper limit is set for the imaginary tray in order to obtain meaningful display. That is, a processing waiting sheet number count c1 is set to Min (processing waiting sheet number count on the tray information, and maximum value of the stacking upper limit of a physical tray included in the sheet discharge apparatus). Further, a standby sheet number count c2 is set to Min (standby sheet number count on the tray information, and value satisfying (maximum value of the stacking upper limit of the physical tray included in the sheet discharge apparatus)−c1). Then, the processing waiting sheet height h3 is set to P×c1, and the standby sheet height h4 is set to P×c2. In this manner, the value of c1+c2 becomes equal to or smaller than the upper limit of the physical tray included in the sheet discharge apparatus, and thus the sheet height of the imaginary sheet bundle has a finite value.

After Steps S504 to S507 described above, the controller 111 determines whether or not the tray N is an imaginary tray (Step S508). When the tray N is not the imaginary tray (Step S508: N), the processing proceeds to Step S510. When the tray N is the imaginary tray (Step S508: Y), the controller calculates the excess stacking number with respect to the tray N, and displays the excess stacking number in the second display layer (Step S509). The excess stacking number is calculated by, for example, rounding up the value of "(total stacked-sheet number count of tray N)/(number of sheets stacked on tray N)" to an integer value. After that, the controller 111 displays the calculated excess stacking number at a predetermined position for each tray. After the above-mentioned processing, the controller 111 determines whether or not, in the received stacking state information, all pieces of tray information that are required to be displayed have been displayed (Step S510). When the display is not finished (Step S510: N), the controller 111 adds 1 to the variable N (Step S511), and the processing returns to Step S503. When the display is finished (Step S510), the series of processing is ended.

Now, detailed description is given of the excess stacking number 1114 illustrated in FIG. 11. The job list 131 displayed in the list region 1110 of FIG. 11 has five standby jobs. In all of the five standby jobs, the large-capacity stacker 320 is designated as the sheet discharge tray. The total number of image forming sheets of those five jobs is 14,000. Referring to the control flow of FIG. 7, the tray information corresponding to the stacking tray of the large-capacity stacker 320 has 4,000 as the total stacked-sheet number count, and the tray information corresponding to the imaginary tray of the large-capacity stacker 320 has "10,000" as the total stacked-sheet number count. The excess stacking number in this case is 3, which is obtained by rounding up 10,000/4,000-2.5 to an integer value. In this case, the sheet image 1112 is a sheet image representing 4,000 sheets to be stacked onto the stacking tray, and the remaining 10,000 sheets are to be stacked onto the large-capacity stacker 320. In this case, sheet bundles corresponding to an amount of three trays are further stacked in total. The excess stacking number is a numerical value representing this amount, and represents the number of sheets to be further stacked onto the tray. Further, the jobs are all in the standby state, and hence both of the sheet bundle 1112 and the imaginary sheet bundle 1113 of FIG. 11 are displayed with the fourth display color in Step S507.

FIG. 13A to FIG. 13D are explanatory illustrations for illustrating a method of displaying the sheet image in Step S505. In this case, description is given of an example of a case in which the sheet image is mapped at the ejection tray of the large-capacity stacker 320 in the system configuration image. FIG. 13A is an illustration of a sheet image representing a sheet bundle 1301 having a height h. The height h of the sheet bundle 1301 is a height of the sheets in each state calculated in each of Steps S504, S505, S506, and S507 of FIG. 12. The sheet bundle 1301 is displayed (rendered) by seven points from vertex A to vertex G. FIG. 13B is an illustration of a list 1302 representing a method of calculating the coordinates of each vertex. In the list 1302, with the coordinates of the vertex A (coordinate values thereof are expressed as (x, y)) serving as a reference, coordinate values of the other vertices (B to G) are determined by adding or subtracting a predetermined offset value and the sheet height h to or from the coordinate values (x, y) of the vertex A. The sheet image representing the sheet bundle 1301 is displayed (rendered) by a rendering command of, for example, scalable vector graphics (SVG). FIG. 13C is an example of a rendering command in a case in which SVG is used as an example, at the time when the sheet image is rendered with a display color (COLOR). In actual rendering, the display color is the name or the RGB value of the color or a pattern image. The shape of the sheet bundle 1301 differs depending on the shape of the corresponding sheet discharge tray, but the point that the shape is determined based on the tray position coordinates, the predetermined offset value, and the sheet height is the same. FIG. 13D is an illustration of a correspondence table 1304 for showing a method of determining the coordinates of the reference vertex A of the four sheet bundles that are required to be displayed based on the processing of Steps S504, S505, S506, and S507 of FIG. 12, and the correspondence of the display color. The sheet heights h1, h2, h3, and h4 in the correspondence table 1304 are the sheet heights calculated in each step of the processing of FIG. 12. Further, the coordinates of the reference vertex A of the processed sheets to be rendered in Step S504 are the same as the tray position coordinates of the tray N. When the tray position coordinates are represented by (X, Y), the coordinates of the reference vertices A of the sheets being processed, the processing waiting sheets, and the standby sheets are each coordinates shown in the correspondence table 1304. This means that, when a display region is a coordinate region having the upper left as the origin, the sheet images corresponding to the processed sheets, the sheets being processed, the processing waiting sheets, and the standby sheets are displayed to be arrayed vertically upward in the stated order. Further, the display colors (COLOR) may be certain display colors different from one another. A color is used in this case, but the display color may be pattern display, for example, shading and hatching. With use of those coordinate values, sheet heights, and display colors, the controller 111 can generate four types of sheet bundles at the maximum for each tray, and display those sheet bundles in the second display layer.

Figure 14:
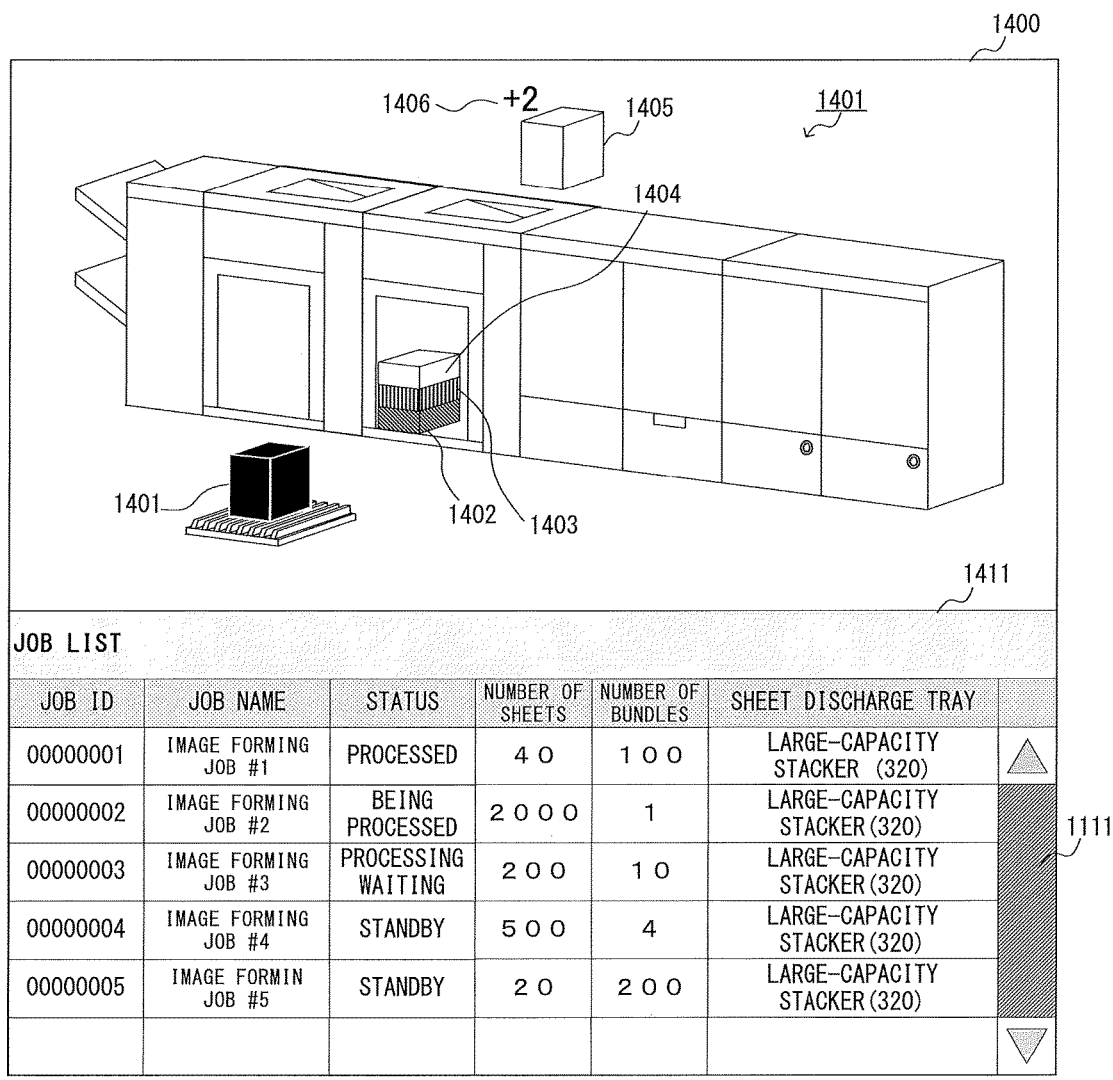
FIG. 14 is a schematic diagram for illustrating a state in which sheet images of different display modes are displayed.

Next, description is given of a case in which the job list has jobs with a plurality of different statuses in a mixed manner, and sheet images having different display modes depending on the status are displayed on the monitor screen. FIG. 14 is an illustration of a display example of a monitor screen 1400 at this time. In the example of FIG. 11, all of the jobs are standby jobs. FIG. 14 is an illustration of change from the state of e job list illustrated in FIG. 11. That is, it is assumed that an instruction to form an image is issued for jobs having the job names of image forming jobs #1, #2, and #3. The image forming job #1 is in the "processed" state in which processing is finished for all sheets. The image forming job #2 is in the state of "being processed", and the image forming job #3 is in the "processing waiting" state. In a list region 1411 of FIG. 14, a job list representing those states is displayed. The status of each job in the job list is changed from that in FIG. 11.

As actual stacking states on the sheet discharge trays, 4,000 sheets (40 sheets×100 bundles) corresponding to the image forming job #1 are discharged to the ejection tray of the large-capacity stacker 320, whose stacking upper limit is 4,000. Further, a part of 2,000 sheets corresponding to the image forming job #2 are discharged to the stacking tray. Sheet bundles 1401 to 1405 are display modes of the sheet images in this state.

The sheet image 1401 representing the sheet bundle that is stacked on the ejection tray and corresponds to a total of 4,000 sheets of the image forming job #1 is displayed with the first display color in accordance with FIG. 12. In the sheet image 1402 representing the sheet bundle corresponding to the discharged sheets of the image forming job #2, the processing of Step S219 has not been finished for this image forming job in accordance with FIG. 8. That is, the status of the sheet bundle information is "being processed", which is the status at the time point at which e sheet bundle information is added in Step S208. Therefore, those values of the number of sheets are stored in the "sheet-being-processed number count" of the tray information corresponding to the stacking tray. The sheet bundle 1402 is displayed with the second display color that is different from the first display color in Step S505 of FIG. 12. The sheet bundle 1402 is shaded in FIG. 14.

The total of the number of the undischarged sheets to be stacked, which correspond to the image forming job #2, and the number of sheets of the sheet bundle information corresponding to the image forming job #3 is stored in the tray information as the "processing waiting sheet number count". The sheet bundle 1403 is displayed with the third display color that is different from the first and second display colors in Step S506. The sheet bundle 1403 is illustrated with vertical lines in FIG. 14. The sheet bundle 1404 corresponding to the standby job is displayed with the fourth display color that is different from the first to third display colors in accordance with Step S507. The sheet bundle 1405 is similarly a sheet bundle corresponding to the standby job, and the total of the numbers of sheets (14,000 sheets) of the five jobs is larger than the total number of the stacking upper limits of the ejection tray and the stacking tray. Therefore, an imaginary tray is displayed at a predetermined portion. An excess stacking number 1406 of the imaginary tray is +2 (which is obtained by rounding up the value of (14,000−4,000−4,000)/4,000 to an integer value).

As described above, in the first embodiment, for each sheet discharge tray, the amount of sheets corresponding to the processed job, the amount of discharged sheets corresponding to the job being processed, the amount of sheets before discharge corresponding to the processing waiting job, and the amount of sheets corresponding to the standby job are displayed in different display modes, and thus the amounts can be visually recognized. Further, with the display of the sheet image and the excess stacking number for the imaginary tray, how many more sheets that cannot be stacked onto the sheet discharge apparatus are present in the current sheet stacking state can also be visually recognized. Therefore, the stacking amount can be estimated thereafter, and the number of times to take out the sheets that is required in the future can be recognized. Thus, the convenience is enhanced.

Other Embodiments

In the first embodiment, a configuration example in which the information processing apparatus 100 and the image forming apparatus 101 are separate members is described, but the image forming apparatus 101 may have the function of the information processing apparatus 100. That is, the image forming apparatus 101 may include the storage 112, the display 113, and the input portion 114. In this case, the functions of generating the system configuration image and the sheet image are achieved by the controller 121. That is, the controller 121 generates the system configuration image and the sheet image, and operates as a control device for displaying the generated system configuration image and the generated sheet image on the display 113.

Further, in the first embodiment, the stacking state information is transmitted to the information processing apparatus 100 every time one sheet image is formed, but this is merely an example. For example, the stacking state information may be transmitted each time a predetermined time period elapses. Further, in the first embodiment, the entire stacking state information is transmitted to the information processing apparatus 100, but only the difference from the previously-transmitted stacking state information may be transmitted. In the first embodiment, description is given of an example in which the excess stacking number 1114 is represented by a numerical value, but other characters and symbols, for example, alphabet, may be used.

As described above, according to the embodiments, the current stacking state and the future stacking state at the sheet discharge destination can be easily recognized for each image forming job and each sheet state.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation to encompass all such modifications and equivalent structures and functions.

This application claims the benefit of Japanese Patent Application No. 2017-101139, filed May 22, 2017, which is hereby incorporated by reference herein in its entirely.

What is claimed is:

1. A control device to control a system having an image forming apparatus to form an image onto a sheet based on an image forming job, and a sheet stacking apparatus having a stacking tray on which the sheet is to be stacked, the control device comprising:
    a first storage configured to store stacking state information indicating a state of sheets stacked and/or to be stacked on the stacking tray;
    a controller configured to control to generate a system configuration image that visualizes a configuration of the system, to generate a sheet bundle image that visualizes a sheet bundle stacked on the stacking tray, and to display a screen in which the sheet bundle image is combined at a position of the stacking tray in the system configuration image,
    wherein the controller is configured to control to display the sheet bundle image such that sheets of a processed job, sheets of a being-processed job, and sheets of a processing waiting job are distinguished from each other,
    wherein the processed job is a job for which processing is finished,
    wherein the being-processed job is a job for which the processing is being executed, and
    wherein the processing waiting job is a job for which the processing waits; and
    a second storage configured to store a list of job attributes representing any one of the processed jobs, the being-processed job, and the processing waiting job in an order of discharge of the sheet having the image formed thereon from the image forming apparatus,
    wherein the controller is capable of controlling to display the sheet bundle image in an order on the list of job attributes.

2. The control device according to claim 1, wherein the controller is configured to control to display parts of the sheets to be stacked in the sheet bundle image in different display modes.

3. The control device according claim 1, wherein the controller is configured to control to display each of the part of the stacked sheets and the part of the sheets to be stacked in the sheet bundle image as a sheet bundle having a height corresponding to an amount of each part.

4. The control device according to claim 3, wherein the sheet bundle image represents one sheet bundle having a plurality of sheet bundles having different display modes.

5. The control device according to claim 1,
    wherein the sheet stacking apparatus has an upper limit set on a stackable amount of the sheets having the images formed thereon, and
    wherein the controller is configured to control to display an imaginary tray at a predetermined portion of the system configuration image when a total of the updated amounts exceeds the upper limit.

6. The control device according to claim 5, wherein the imaginary tray includes a logical sheet stacking portion for which no upper limit is set.

7. The control device according to claim 5, wherein the imaginary tray includes a logical sheet stacking portion for which a stacking amount is set to be equal to or smaller than the upper limit.

8. The control device according to claim 5, wherein, instead of display of the imaginary tray or together with the imaginary tray, the controller is configured to control to display the sheet bundle image representing one of imaginary sheets corresponding to an amount exceeding the upper limit and an imaginary sheet bundle being a group of the imaginary sheets at a portion of the imaginary tray.

9. The control device according to claim 8, wherein the controller is configured to control to display one of a numerical value, a character, and a symbol representing the amount exceeding the upper limit at the portion of the imaginary tray.

10. A method for a control device to control a system having an image forming apparatus to form an image onto a sheet based on an image forming job, and a sheet stacking apparatus having a stacking tray on which the sheet is to be stacked, the method comprising:
    storing, in a first storage, stacking state information indicating a state of sheets stacked and/or to be stacked on the stacking tray;
    controlling to generate a system configuration image that visualizes a configuration of the system, to generate a sheet bundle image that visualizes a sheet bundle stacked on the stacking tray, and to display a screen in which the sheet bundle image is combined at a position of the stacking tray in the system configuration image,
    wherein controlling includes controlling to display the sheet bundle image such that sheets of a processed job, sheets of a being-processed job, and sheets of a processing waiting job are distinguished from each other,
    wherein the processed job is a job for which processing is finished,
    wherein the being-processed job is a job for which the processing is being executed, and
    wherein the processing waiting job is a job for which the processing waits; and storing, in a second storage, a list of job attributes representing any one of the processed jobs, the being-processed job, and the processing waiting job in an order of discharge of the sheet having the image formed thereon from the image forming apparatus, wherein controlling includes controlling to display the sheet bundle image in an order on the list of job attributes.

11. A non-transitory computer-readable storage medium storing a program to cause a control device to perform a method for a control device to control a system having an image forming apparatus to form an image onto a sheet based on an image forming job, and a sheet stacking apparatus having a stacking tray on which the sheet is to be stacked, the method comprising:

storing, in a first storage, stacking state information indicating a state of sheets stacked and/or to be stacked on the stacking tray;

controlling to generate a system configuration image that visualizes a configuration of the system, to generate a sheet bundle image that visualizes a sheet bundle stacked on the stacking tray, and to display a screen in which the sheet bundle image is combined at a position of the stacking tray in the system configuration image, wherein controlling includes controlling to display the sheet bundle image such that sheets of a processed job, sheets of a being-processed job, and sheets of a processing waiting job are distinguished from each other, wherein the processed job is a job for which processing is finished, wherein the being-processed job is a job for which the processing is being executed, and wherein the processing waiting job is a job for which the processing waits; and storing, in a second storage, a list of job attributes representing any one of the processed jobs, the being-processed job, and the processing waiting job in an order of discharge of the sheet having the image formed thereon from the image forming apparatus, wherein controlling includes controlling to display the sheet bundle image in an order on the list of job attributes.

* * * * *